US012562629B2

(12) United States Patent
Nguyen et al.

(10) Patent No.: US 12,562,629 B2
(45) Date of Patent: Feb. 24, 2026

(54) ELECTRIC MACHINE WITH TWO-PHASE PLANAR LORENTZ COILS AND A RING-SHAPED HALBACH ARRAY FOR HIGH TORQUE DENSITY AND HIGH-PRECISION APPLICATIONS

(71) Applicant: MAX-PLANCK-GESELLSCHAFT ZUR FÖRDERUNG DER WISSENSCHAFTEN E.V., Munich (DE)

(72) Inventors: Vu Nguyen, Livermore, CA (US); Bernard Javot, Stuttgart (DE); Katherine J. Kuchenbecker, Stuttgart (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 112 days.

(21) Appl. No.: 18/557,558

(22) PCT Filed: Mar. 17, 2022

(86) PCT No.: PCT/EP2022/057049
§ 371 (c)(1),
(2) Date: Oct. 26, 2023

(87) PCT Pub. No.: WO2022/228773
PCT Pub. Date: Nov. 3, 2022

(65) Prior Publication Data
US 2024/0223054 A1 Jul. 4, 2024

(30) Foreign Application Priority Data

Apr. 27, 2021 (EP) ..................................... 21170679

(51) Int. Cl.
| H02K 21/24 | (2006.01) |
| H02K 1/14 | (2006.01) |
| H02K 1/2795 | (2022.01) |

(52) U.S. Cl.
CPC ............. *H02K 21/24* (2013.01); *H02K 1/146* (2013.01); *H02K 1/2795* (2022.01)

(58) Field of Classification Search
CPC ...... H02K 21/24; H02K 1/2795; H02K 1/146; H02K 1/27; H02K 1/18; H02K 3/28; H02K 3/47; H02K 1/30; H02K 2213/03
See application file for complete search history.

(56) References Cited

U.S. PATENT DOCUMENTS

| 2014/0354243 A1 * | 12/2014 | Oelofse ................. H01F 7/0221 |
| | | 310/90 |
| 2016/0375534 A1 * | 12/2016 | Park .................. H01L 21/68792 |
| | | 335/290 |

FOREIGN PATENT DOCUMENTS

| WO | WO-2016089855 A1 * | 6/2016 | ............. H02K 7/025 |
| WO | WO 2019/228326 A1 | 12/2019 | |

OTHER PUBLICATIONS

Amemiya et al. (2004) "Virtual leading blocks for the deaf-blind: a real-time way-finder by verbal-nonverbal hybrid interface and high-density RFID tag space," IEEE Virtual Reality 2004, Chicago, IL, USA, pp. 165-287.

(Continued)

*Primary Examiner* — Alexander A Singh
*Assistant Examiner* — Charlie Frank Mann, Jr.
(74) *Attorney, Agent, or Firm* — LEYDIG, VOIT & MAYER, LTD.

(57) ABSTRACT

An electric machine, in particular a motor or a generator, comprising a rotor and a stator, wherein the rotor comprises a planar, ring-shaped rotor base element and the stator comprises a planar ring-shaped stator base element, wherein (Continued)

the rotor base element and the stator base element are aligned along an axial axis (Z) of the electric machine, wherein a plurality of magnet elements are arranged around the circumference of the ring-shaped rotor base element forming a Halbach magnet-ring assembly, wherein the Halbach magnet-ring assembly generates a magnetic field ($B_R$) with axial and azimuthal components, wherein a plurality of coils are arranged around the circumference (C) of the ring-shaped stator base element.

14 Claims, 10 Drawing Sheets

(56) References Cited

OTHER PUBLICATIONS

Badke et al. (2011) "Tongue-Based Biofeedback for Balance in Stroke: Results of an 8-Week Pilot Study," Arch. Phys. Med. Rehabil, No. 92, pp. 1364-1370.

Baumann (1997) et al. "The PantoScope: a Spherical Remote-Center-of-Motion Parallel Manipulator for Force Reflection," Proc. Intl. Conf. Robotics and Automation (ICRA), Albuquerque, NM, USA, pp. 718-723.

Ben-Tzvi et al. (2015) "Sensing and Force-Feedback Exoskeleton (SAFE) Robotic Glove," in IEEE Trans. Neural Systems and Rehabilitation Engineering, vol. 23, No. 6, pp. 992-1002.

Buttolo et al. (1995) "Pen-Based Force Display for Precision Manipulation in Virtual Environments," Proc. Virtual Reality Ann. Intl. Symp. 1995, Research Triangle Park, NC, USA, pp. 217-224.

Clark et al. (2019) "On the Role of Wearable Haptics for Force Feedback in Teleimpedance Control for Dual-Arm Robotic Teleoperation," Proc. Intl. Conf. Robotics and Automation (ICRA), Montreal, QC, Canada, 2019, pp. 5187-5193).

Ellis et al (1996) "Design and Evaluation of a High-Performance Haptic Interface," Robotica, vol. 14, No. 3, pp. 321-327.

European Search Report dated Oct. 6, 2021 in corresponding European Application No. 21170679.1.

Ganesh et al. (2013) "Feeling the force: Returning haptic signals influence effort inference during motor coordination," Scientific Reports, No. 3, iss. 2648.

Gassert et al. (2013) "Physical Student-Robot Interaction With the ETHZ Haptic Paddle," in IEEE Transactions on Education, vol. 56, No. 1, pp. 9-17.

Gillespie et al (2003) "Haptic Interface for Hands-On Instruction in System Dynamics and Embedded Control," 11th Symposium on Haptic Interfaces for Virtual Environment and Teleoperator Systems, Los Angeles, CA, USA, pp. 410-415.

Girone et al. (2000) "Orthopedic Rehabilitation Using the "Rutgers ankle" Interface" Stud. Health Technol. Inform., No. 70, pp. 89-95.

Hollis et al. (1991) "A Six-Degree of-Freedom Magnetically Levitated Variable Compliance Fine-Motion Wrist: Design, Modeling, and Control," in IEEE Trans. Robotics and Automation, vol. 7, No. 3, pp. 320-332.

Huq et al. (2012) "Development of a Portable Robot and Graphical User Interface for Haptic Rehabilitation Exercise," 4th IEEE Ras & EMBS Intl. Conf. Biomedical Robotics and Biomechatronics (BioRob), Rome, pp. 1451-1457.

International Search Report and Written Opinion, dated Jul. 11, 2022, corresponding to International Application No. PCT/EP2022/057049, (from which the present application claims priority,) 10 pp.

Kim et al. (2010) "On the Design of Miniature Haptic Devices for Upper Extremity Prosthetics," in IEEE/ASME Trans. Mechatronics, vol. 15, No. 1, pp. 27-39.

Martinez et al. (2016) "3-D printed haptic devices for educational applications," IEEE Haptics Symposium (HAPTICS), Philadelphia, PA, pp. 126-133.

Millman et al. (1993) "Design of a High Performance Haptic Interface to Virtual Environments," IEEE Virtual Reality Ann. Intl. Symp., Seattle, Wa, USA, pp. 216-222.

Mishima et al. (2009) "Haptic Teleoperation of Humanoid Robot Hand Using Three-Dimensional Force Feedback", IFAC Proc. Volumes, vol. 42, iss. 16, pp. 431-436.

Nguyen et al. (2012) "Novel Electromagnetic Design for a Precision Planar Positioner Moving Over a Superimposed Concentrated-Field Magnet Matrix," in IEEE Trans. Energy Conversion, vol. 27, No. 1, pp. 52-62.

Seifi et al. (2019) "Haptipedia: Accelerating Haptic Device Discovery to Support Interaction & Engineering Design," in CHI Conf. Human Factors in Computing Systems Proc. (CHI 2019), Glasgow, Scotland, UK.

Velázquez et al. (2010) "Preliminary Evaluation of Podotactile Feedback in Sighted and Blind Users," Ann. Intl. Conf. IEEE Engineering in Medicine and Biology, Buenos Aires, pp. 2103-2106.

Yokokohji et al. (1996) "What You Can See is What You Can Feel—Development of a Visual/Haptic Interface to Virtual Environment," Proc. IEEE 1996 Virtual Reality Ann. Intl. Symp., Santa Clara, CA, USA, pp. 46-53.

Zheng et al. (Feb. 2020) "Optimisation method of magnetic levitation actuator for rotary table," IET Electric Power Applications, IET, UK, vol. 14, No. 5, pp. 893-900.

* cited by examiner

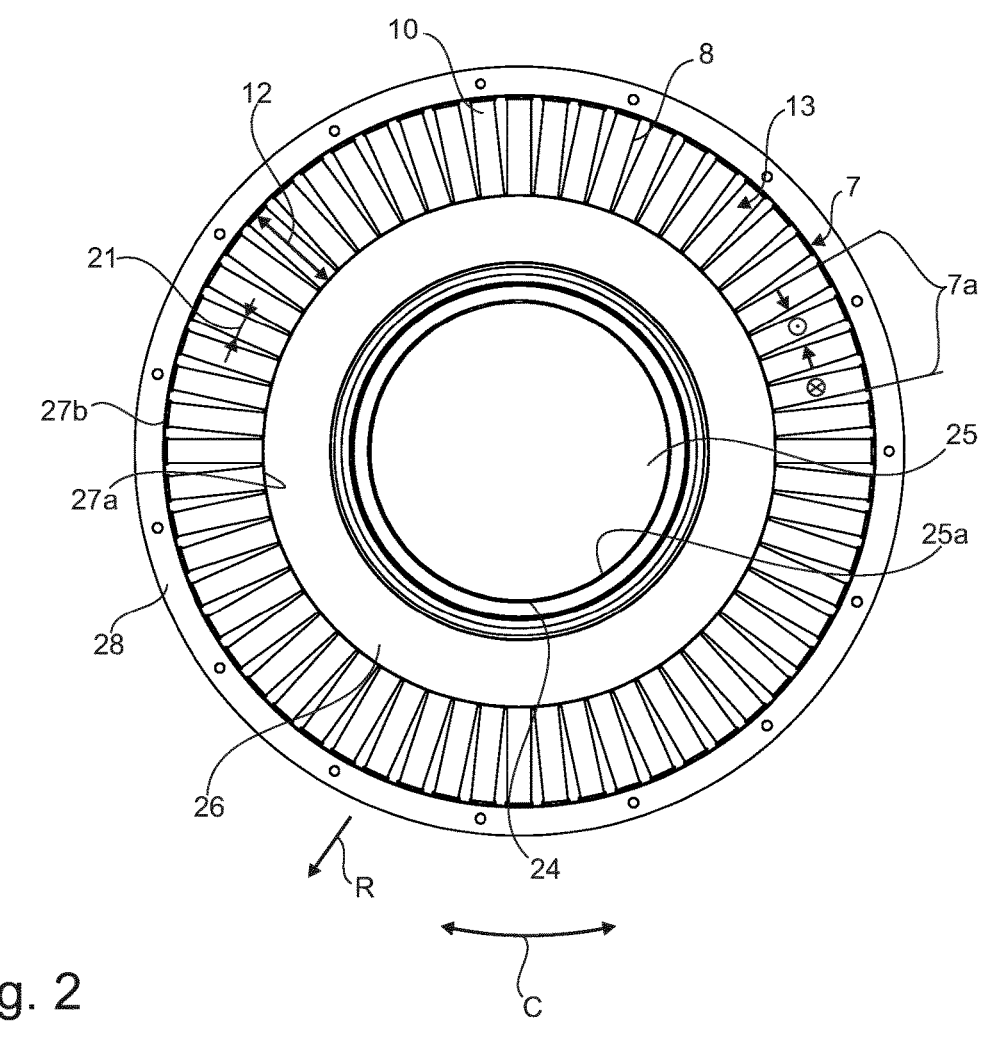
Fig. 2
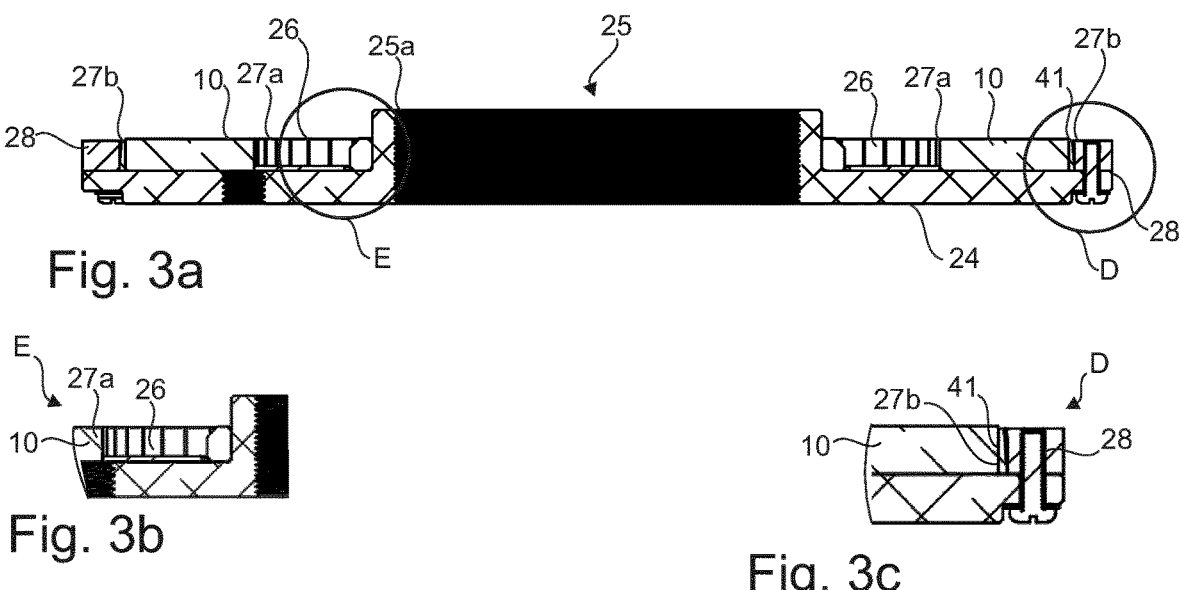
Fig. 3a
Fig. 3b
Fig. 3c

ELECTRIC MACHINE WITH TWO-PHASE PLANAR LORENTZ COILS AND A RING-SHAPED HALBACH ARRAY FOR HIGH TORQUE DENSITY AND HIGH-PRECISION APPLICATIONS

CROSS-REFERENCE TO RELATED APPLICATIONS

This application is a U.S. National Stage Application filed under 35 U.S.C. § 371 of International Application No. PCT/EP2022/057049, filed Mar. 17, 2022, which claims the benefit of European Application No. 21170679.1, filed Apr. 27, 2021. Both of these applications are hereby incorporated by reference in their entireties.

BACKGROUND OF THE INVENTION

The invention relates to an electrical machine, in particular a motor or a generator comprising a rotor and a stator.

Such an electric machine is suitable for a variety of applications including haptic devices, robotic locomotion, and high-precision alignment and positioning systems. In the specific application of haptics and force feedback, it is desirable to use motors that can provide strong and continuous torque at low speed. In conventional electric motors with salient-pole and cylindrical-winding constructions, the motor's torque is strongest only at certain discretized positions corresponding to the rotor-stator alignment of magnetic poles. Consequently, such motors need to operate at a sufficiently high speed so that the rotations can be smoothed out by the rotor inertia, and the torque ripples can be averaged out. For the low-speed regime, motors are, therefore, equipped with a gearbox or a pulley-belt unit to reduce the speed, increase the torque, and improve the positional accuracy. The drawbacks of a gearbox for haptic applications are its inertia, backlash, vibrations, and possible damage under impact loads. The downsides of a pulley-belt unit include slippage with a large load or sudden impact; its rotational resistance and elasticity are also a challenge for estimating the external torque from the motor currents. Moreover, with a motor working at a high speed and a transmission unit to reduce that speed, the vibrations from the motor and transmission go directly into the angular-position or torque controller and are amplified through the feedback loop. Consequently, the user can feel these undesired vibrations and disturbances.

Haptic and force-feedback devices have been researched and developed since the 1990s. For example: R. L. Hollis, S. E. Salcudean and A. P. Allan, "A Six-Degree of-Freedom Magnetically Levitated Variable Compliance Fine-Motion Wrist: Design, Modeling, and Control," in IEEE Trans. Robotics and Automation, vol. 7, no. 3, pp. 320-332, June 1991; P. A. Millman, M. Stanley and J. E. Colgate, "Design of a High Performance Haptic Interface to Virtual Environments," IEEE Virtual Reality Ann. Intl. Symp., Seattle, WA, USA, 1993, pp. 216-222; P. Buttolo and B. Hannaford, "Pen-Based Force Display for Precision Manipulation in Virtual Environments," Proc. Virtual Reality Ann. Intl. Symp. 1995, Research Triangle Park, NC, USA, 1995, pp. 217-224; Y. Yokokohji, R. L. Hollis and T. Kanade, "What You Can See is What You Can Feel—Development of a Visual/Haptic Interface to Virtual Environment," Proc. IEEE 1996 Virtual Reality Ann. Intl. Symp., Santa Clara, CA, USA, 1996, pp. 46-53; R. E. Ellis, O. M. Ismaeil, and M. G. Lipsett, "Design and Evaluation of a High-Performance Haptic Interface," Robotica, vol. 14, no. 3, pp. 321-327, May 1996; R. Baumann, W. Maeder, D. Glauser and R. Clavel, "The PantoScope: a Spherical Remote-Center-of-Motion Parallel Manipulator for Force Reflection," Proc. Intl. Conf. Robotics and Automation (ICRA), Albuquerque, NM, USA, 1997, pp. 718-723.

The haptics and force-feedback application area originated from the need for two-way physical interactions between the operator, a human subject, and an environment, which can be real or virtual, through a mechanical device. The operator moves this device to command motion in the environment, and, in return, the device creates a force and/or torque representing the influence of the environment back to the operator's limb. The force/torque generated by the device aims to mimic the reaction from the environment and to give the operator the perception of a direct mechanical interaction with the environment. This, on one hand, greatly enhances the familiarity and understanding of the operator to the environment. On the other hand, it helps study the human's behaviors and reactions when interacting with either an actual or simulated environment. Force-feedback devices have had a wide range of applications including safe and precise teleoperation (M. Mishima, H. Kawasaki, T. Mouri, and T. Endo, "Haptic Teleoperation of Humanoid Robot Hand Using Three-Dimensional Force Feedback", IFAC Proc. Volumes, vol. 42, iss. 16, 2009, pp. 431-436; J. P. Clark, G. Lentini, F. Barontini, M. G. Catalano, M. Bianchi and M. K. O'Malley, "On the Role of Wearable Haptics for Force Feedback in Teleimpedance Control for Dual-Arm Robotic Teleoperation," Proc. Intl. Conf. Robotics and Automation (ICRA), Montreal, QC, Canada, 2019, pp. 5187-5193), robotic rehabilitation ("Orthopedic Rehabilitation Using the "Rutgers ankle" Interface" Stud. Health Technol. Inform., no. 70, pp. 89-95, 2000; R. Huq, E. Lu, R. Wang and A. Mihailidis, "Development of a Portable Robot and Graphical User Interface for Haptic Rehabilitation Exercise," 4th IEEE RAS & EMBS Intl. Conf. Biomedical Robotics and Biomechatronics (BioRob), Rome, 2012, pp. 1451-1457; P. Ben-Tzvi and Z. Ma, "Sensing and Force-Feedback Exoskeleton (SAFE) Robotic Glove," in IEEE Trans. Neural Systems and Rehabilitation Engineering, vol. 23, no. 6, pp. 992-1002, November 2015), and studying human sensory and motor skills (T. Amemiya, J. Yamashita, K. Hirota and M. Hirose, "Virtual leading blocks for the deaf-blind: a real-time way-finder by verbal-nonverbal hybrid interface and high-density RFID tag space," IEEE Virtual Reality 2004, Chicago, IL, USA, 2004, pp. 165-287; K. Kim, J. E. Colgate, J. J. Santos-Munné, A. Makhlin and M. A. Peshkin, "On the Design of Miniature Haptic Devices for Upper Extremity Prosthetics," in IEEE/ASME Trans. Mechatronics, vol. 15, no. 1, pp. 27-39, February 2010; R. Velázquez and O. Bazán, "Preliminary Evaluation of Podotactile Feedback in Sighted and Blind Users," Ann. Intl. Conf. IEEE Engineering in Medicine and Biology, Buenos Aires, 2010, pp. 2103-2106; M. B. Badke, J. Sherman, P. Boyne, S. Page, and K. Dunning, "Tongue-Based Biofeedback for Balance in Stroke: Results of an 8-Week Pilot Study," Arch. Phys. Med. Rehabil, no. 92, pp. 1364-70, September 2011; G. Ganesh, R. Osu, and E. Naito, "Feeling the force: Returning haptic signals influence effort inference during motor coordination," Scientific Reports, no. 3, iss. 2648, December 2013).

The Haptipedia website provides a comprehensive list of force-feedback devices (for fingers, hand, and foot) with parallel and/or serial mechanisms having 1-3 spatial dimensions (H. Seifi, F. Fazlollahi, M. Oppermann, J. A. Sastrillo, J. Ip, A. Agrawal, G. Park, K. J. Kuchenbecker, and K. E. Maclean, "Haptipedia: Accelerating Haptic Device Discovery to Support Interaction & Engineering Design," in CHI Conf. Human Factors in Computing Systems Proc. (CHI 2019), May 4-9, 2019, Glasgow, Scotland, UK). Due to the very small torque and high nominal speed (10's of mN-m and 1000's of revolutions per minute, RPM) of the existing electric motors that were identified as most suitable for force-feedback applications (R. Gassert et al., "Physical Student-Robot Interaction With the ETHZ Haptic Paddle," in IEEE Transactions on Education, vol. 56, no. 1, pp. 9-17, February 2013; M. O. Martinez et al., "3-D printed haptic devices for educational applications," 2016 IEEE Haptics Symposium (HAPTICS), Philadelphia, PA, 2016, pp. 126-133), the reported devices had to use a transmission mechanism either through a pulley-belt unit or a gearbox together with linkages or a friction wheel. In these cases, the haptic-paddle devices had multiple moving parts (even for 1-DOF operation) with a limited rotational work space. Multiple moving parts, as with transmissions and linkages, introduce friction, wear, backlash, and position errors into the system and reduce the device's lifetime. In addition, the linkages or leverage mechanisms unavoidably put constraints into the mechanical design and significantly limit the device's working range.

The torque constant of conventional AC and DC motors is practically the averaged value of the torque that can be produced around a full revolution of the motor at a sufficiently high speed where the torque ripples are negligible. A higher gear-reduction ratio makes the output torque smoother and enhances the position accuracy at the output shaft but introduces more inertia into the mechanical system and degrades the haptic transparency of the device.

BRIEF SUMMARY OF THE INVENTION

The objective of this invention is to provide a new motor structure that can operate at and around zero speed at any angular position with high torque density and high positional accuracy. Further, it is an objective of this invention to provide a force-feedback device comprising such a new motor structure.

The objectives of this invention are addressed by the embodiments described herein.

Essential to the invention is an electric machine, in particular a motor or a generator, comprising a rotor and a stator, wherein the rotor comprises a planar, ring-shaped rotor base element and the stator comprises a planar ring-shaped stator base element, wherein the rotor base element and the stator base element are aligned along an axial axis (Z) of the electric machine, wherein a plurality of magnet elements are arranged around the circumference (C) of the ring-shaped rotor base element forming a Halbach magnet-ring assembly, wherein the Halbach magnet-ring assembly generates a magnetic field ($B_R$) with axial and azimuthal components, wherein a plurality of planar coils are arranged around the circumference (C) of the ring-shaped stator base element.

This invention provides an electric machine in particular a motor which generates a constant torque at any angular position. Preferably this motor is brushless and ironless. It realizes the following properties: 1) generating high torque at any angular position without the need of a gearbox, 2) operating at very low speed (0-10's of revolutions per minute), and 3) having a simple mathematical model to enable external force estimation based on the motor currents. Because the electric machine outputs a continuous torque with a high torque density, continuous rotation, and no cogging torque, this motor design is suitable for a variety of applications including haptic devices, robotic locomotion, and high-precision alignment and positioning systems with zero backlash and a minimum number of moving parts.

A Halbach magnet-ring assembly generates a magnetic field, which is strengthened on one side (the effective side for torque generation) and canceled on the other side (not effective) of the structure. The electric machine extends in an axial direction (Z) and in the radial direction on an XY plane perpendicular to the Z-axis. The axial component of the magnetic field ($B_r$) extends along the axial direction (Z) of the machine. The azimuthal components of the magnetic field ($B_r$) extend in a plane perpendicular to the Z-axis.

The key advantages of such a Halbach-ring motor design for haptic applications include 1) no high-frequency vibration as with traditional electric motors running at a high speed combined with a transmission unit; 2) a closed-loop-control position resolution that depends only on the position sensing accuracy used with the motor, not the motor's magnetic design, and 3) no gear backlash, no pulley slippage, and no concern about damaging the transmission when the device is overloaded or subject to sudden impacts. Further the electric machine may be used as a generator, which converts mechanical rotation into electricity. In the following the case of the motor is described; however, these descriptions and embodiments may also be employed for an electric machine used as a generator.

Preferably the magnet elements are permanent magnets. Advantageously the magnet elements are rare-earth magnets. Rare-earth magnets are strong permanent magnets made from alloys of rare-earth elements. The magnetic field produced by rare-earth magnets can exceed 1.4 T. Preferably the magnet elements are neodymium magnets or samarium-cobalt magnets.

Advantageously the magnet elements form a preferably planar magnet array, wherein the planar magnet array comprises an integer multiple of spatial periods. Such a spatial period may also be called spatial pitch. Preferably each spatial period has a fixed number of magnet elements. Further, it is of advantage, that the individual magnet elements have individually oriented magnetization directions ($M_i$). Preferably the individual magnet elements in a spatial period of the magnet array are arranged according to a magnetization orientation pattern. Advantageously the magnetization orientation pattern is a Halbach orientation pattern or Halbach arrangement. A Halbach arrangement or Halbach magnet array is a structure formed by multiple magnet segments with the magnetization orientations switching in one direction (either clockwise or counterclockwise) along a certain dimension of the structure. The resulting magnetic field on one side of the structure/array is strengthened while on the other side the field is cancelled to near zero. This effect is achieved by having a spatially rotating pattern of magnetization. The individual magnetic fields of the spatially rotating magnetizations of the magnet elements superimpose, resulting in a magnetic field ($B_A$) (magnetic flux density) of the spatial period, which is focused on one side of the magnet array structure.

Preferably the spatial periods of the magnet array have essentially the same magnetization orientation pattern. Advantageously the resulting magnetic field ($B_R$) of the Halbach magnet ring assembly is a superposition of the magnetic fields ($B_A$) of the spatial periods. It is preferred that these magnetic fields ($B_A$) are periodically repeated along a circumferential axis (C) of the Halbach magnet ring assembly. This is due to the fact that the magnetic field orientation pattern is repeated periodically along a circumferential axis (C) of the Halbach magnet ring assembly. The magnetic field is therefore repeated after a certain angular pitch of rotation about the rotor axial axis (Z). Preferably the resulting magnetic field ($B_R$) of the Halbach magnet ring assembly is an approximately sinusoidally varying magnetic field (magnetic flux density) along the circumference of the rotor or the rotor base element. Along a radial direction of the rotor or the rotor base element, within the space covered by the magnets the magnetic field can be considered invariant. A calculation of the spatial dependence of the resulting magnetic field is analog to the document V. H. Nguyen et al. (V. H. Nguyen and W. Kim, "Novel Electromagnetic Design for a Precision Planar Positioner Moving Over a Superimposed Concentrated-Field Magnet Matrix," in IEEE Trans. Energy Conversion, vol. 27, no. 1, pp. 52-62, March 2012). The content of this document shall herewith be entirely incorporated by reference. In this document a sinusoidal varying field was calculated for a linear Halbach magnet arrangement.

With ($n_{mp}$) being the number of magnet elements per spatial period also called the spatial pitch of the Halbach-array ring, the angular step that the magnetization direction rotates between two adjacent magnets is preferably 360°/$n_{mp}$. According to one preferred embodiment the number of magnet elements ($n_{mp}$) in a spatial period of the magnet array is 4. In this case the magnetization orientation switches by 90° between each pair of adjacent magnet elements.

In the preferred case, when looking inward from outside at the magnet array and when going counter-clockwise along the circumference of the magnet array, if the magnetization direction is switched counter-clockwise, then the total magnetic field is focused on the upper part of the magnet array. Alternatively, the upper side of the magnet array is the Halbach array's strong side, where preferably the rotor and coils of the electric machine are placed.

A preferred magnetic field variation, which is nearly sinusoidal along the azimuthal direction, allows the operation of the electrical machine with two-phase Lorentz coils. This means that the spatial pitch does not have to be comprised of exactly $n_{mp}$=4 magnet elements with a 360°/4=90° difference of the magnetization direction between the two adjacent magnets. According to a further preferred embodiment the number of magnet elements ($n_{mp}$) in a spatial period is 8. Preferably the magnetization direction is switched by 360°/8=45° between the two adjacent magnet elements. It is conceivable that the number of magnet elements ($n_{mp}$) may have further values in the form of multiple integers of 4.

According to a further preferred embodiment, the magnet elements are bar-shaped magnets or bar magnets. This means the magnets have a longitudinal extension that yields four long rectangular sides and two faces at the ends. The cross section of the bars is preferably square or rectangular.

Preferably all the magnet elements of the Halbach magnet-ring assembly are essentially identical. In particular it is preferable that the bar magnets have all the same thickness or height along the height direction. Since only one type of bar magnet elements is used, the fabrication process is eased, and the motor is scalable due to the availability of Neodymium magnet bars at a wide variety of sizes. Although other magnet shapes like arc-shaped or trapezoidal magnets are conceivable, bar-shaped magnet elements are preferred since compared to bar magnets, arc-shaped or trapezoidal magnets are commercially available at only a few fixed dimensions. Advantageously the magnet elements are arranged on the ring-shaped rotor base element, such that a longitudinal extension of the magnet element extends along a radial direction of the ring-shaped rotor base element. Preferably a wedge-shaped gap extends between two adjacent magnet elements.

Preferably two adjacent magnet elements enclose an angle ($\alpha_m$). Advantageously the angle ($\alpha_m$) is in a range between 3° and 18°. Preferably the angle ($\alpha_m$) is 6°. Preferably the diameter of the rotor base element is relatively large compared to the length of a magnet element. Preferably the radius of the rotor base element is larger than the length of a magnet element by a factor of 2 to 15, preferably by a factor of 4 to 7. By this the planar ring-magnet array still behaves like a linear magnet array. For that the angle between the two adjacent magnet elements must be sufficiently small in a preferred range between 3° and 18° to keep the magnetic field not considerably weakened at the outer edge of the ring-shaped rotor.

According to a further preferred embodiment a spatial period of the magnet array extends within an angular pitch ($\alpha_p$) of the magnet array. Preferably a ring-shaped magnet array comprises a number ($N_p$) of angular pitches ($\alpha_p$). The number ($N_p$) of angular pitches ($\alpha_p$) is equal to the number of spatial periods. Further it is preferred, that the angular pitch ($\alpha_p$) is given by 360° divided by the number of angular pitches ($N_p$): $\alpha_p$=360°/Np. Preferably an angle ($\alpha_m$) between two adjacent magnet elements is given by 360° divided by the number of angular pitches ($N_p$) and the number ($n_{mp}$) of magnet elements within a spatial period of the magnet array.

$$\alpha_m = \frac{360°}{N_p n_{mp}} = \frac{360°}{n_{mt}}$$

The total number of magnet elements ($n_{mt}$) is therefore given by: $n_{mt}$=$N_p$ $n_{mp}$. According to one embodiment the number of angular pitches ($N_p$) is 15 and the number ($n_{mp}$) of magnet elements within a spatial period is 4. Accordingly the total number of magnet elements ($n_{mt}$) is 60, the angle ($\alpha_m$) between two adjacent magnet elements is 6° and the angular pitch ($\alpha_p$) is 24°.

According to a further preferred embodiment the coils are essentially planar. This means that the coils comprise a smaller extension along a height direction than in the two in-plane directions. Preferably the coils are not provided with an iron core. Such an ironless embodiment is advantageous over iron-core motors in achieving cogging-free output force.

Preferably all the coils arranged on the stator base element are essentially identical. According to a further preferred embodiment each coil comprises two long sides and two short sides. The short sides are connecting the two long sides and preferably have the form of a segment of a circle or an arc. Preferably the length of the long sides of the coils is essentially greater than or equal to the length of a magnetic element. Preferably an inner distance between the two longer side increases in a radially outward direction. Preferably a distance between two longer side of two adjacent coils in a pair increases in a radially outward direction. Thus, the gap between these two long sides is essentially wedge-shaped.

A coil preferably comprises at least one winding, preferably a plurality of windings. Preferably the windings are made of copper wire. Preferably the windings of a coil are stacked along the height direction. Preferably the windings are impregnated into a thermoplastic material. Advantageously the coils are received in a recess of the stator base element, such that the stator base element comprises an essentially level top-surface. Preferably the magnet elements are arranged on the rotor base element such that the rotor base element comprises an essentially level top-surface.

According to a further preferred embodiment the ring-shaped rotor base element and the ring-shaped stator base element are arranged on a holding element, such that the essentially level top surface of the rotor base element and the essentially level top-surface of the stator base element are facing each other. Preferably an air gap is formed between the top surface of the rotor base element and the top surface of the stator base element. Advantageously the top surface of the rotor base element and the top surface of the stator base element are essentially parallel to each other.

Previously known motors using Halbach arrays comprise a radial-flux Halbach cylinder. For a radial-flux Lorentz-force motor one can minimize the torque modeling error only if the surfaces of the coils and magnets are concentric, for which the fabrication of arc-shaped Lorentz coils and the provision of arc-shaped magnets of the right size are both critically challenging. In addition, for the radial-flux design there is no way to adjust the air gap once the stator and rotor are made. Therefore, instead of a radial magnetic field an axial magnetic field generated by a planar magnet ring is employed in this invention. This rotor is to work with an array of preferably planar Lorentz coils arranged on the stator base element. This design enables the parallelism between the top surface of the stator base element and the top surface of the rotor base element and makes the air gap adjustable even after the rotor and stator are fabricated.

According to a further preferred embodiment the plurality of coils are arranged on the stator base element in a non-overlapping manner. Here the coils are arranged next to each other such that parts of adjacent coils do not overlap with regard to the circumferential and height direction.

According to a further preferred embodiment the plurality of coils are arranged on the stator base element in an overlapping manner. In such an overlapping manner only two adjacent coils overlap partially with regard to the circumferential and height direction. Preferably the short sides of two coils cross each other such that a long side of the second coil is arranged within the gap between the two long sides of the first coil. This long side of the second coil may preferably be arranged in the center of the gap formed by the two long sides of the first coil. It is also conceivable that this long side of the second coil is arranged off center of the gap formed by the two long sides. The pair of two overlapping coils becomes thicker in the area of the short sides. An overlapping arrangement is advantageous in terms of higher force production per volume of the stator coils.

According to a further preferred embodiment the plurality of coils comprise at least two coils. Preferably the plurality of coils are divided into two groups of coils (A, B). Advantageously at least one coil is assigned to each of the two groups of coils (A, B). It is further preferred that in the first group (A) of coils a first current ($i_1$) runs and that in the second group (B) of coils a second current ($i_2$) runs. Preferably the first current ($i_1$) and the second current ($i_2$) have a phase difference of an odd-integer multiple of 90°. Thus, the coils are grouped into two phases (A, B). Advantageously the two phases have identical numbers of coils. Preferably the electric machine can be actuated by at least one coil in each phase. The interaction between the preferably sinusoidally varying magnetic field and the two-phase planar Lorentz coil design, which has a 90° phase difference, allows for a constant Lorentz force to be maintained at any point in the working space.

According to a further preferred embodiment, subsets of the two groups (A, B) of coils are alternatingly arranged around the circumferential axis (C), on the stator base element.

Preferably each subset of the two groups (A, B) of coils comprises one coil. Preferably coils adjacent to each other around the circumference C are connected alternatingly to the two phases (A, B). This means a first coil is connected to phase A, the adjacent second coil is connected to phase B, the adjacent third coil is connected to phase A and so on.

According to a further preferred embodiment two adjacent coils form a coil pair. Preferably each subset of the two groups (A, B) of coils comprises one coil pair. Preferably the two coils in each pair are electrically connected in opposite winding directions.

Preferably the plurality of coils is divided into two groups (A, B) of pairs, which are alternatingly arranged around the circumferential axis. This means around the circumferential axis a coil pair of the first group (A) is followed by a coil pair of the second group (B), which is followed by a coil pair of the first group (A) and so on. Advantageously the coil pairs of each group are electrically connected. Preferably the first group (A) of pairs is connected to the first phase (A) and the first current runs through them. Preferably the second group (B) of pairs is connected to the second phase (B) and the second current runs through them. Two successive coils of the same coil pair are connected together with an opposite winding direction.

According to one embodiment a group of two adjacent coils spatially covers four magnet elements. Preferably there is a distance around the circumferential axis between the coil pairs, such that one magnet element is placed between a first group of coil pairs and a second group of coil pairs, in case the coil pairs of the first group and the coil pairs of the second group essentially cover four magnet elements. Thus, to each coil pair five magnet elements are assigned. Of course, such an assignment does not mean specific magnet elements, since due to the relative motion of the rotor to the stator the relative position of a coil pair to the magnet elements changes. The axial component of the magnetic field (perpendicular to the plane of the planar magnet ring) preferably interacts with the radially oriented long sides of the coils and generates Lorentz forces in tangential directions, which produce a net torque to drive the motor. Due to the design of the coils in this first embodiment the two long sides of one coil experience a magnetic field with a phase difference of 90°. An advantage of this two-phase planar Lorentz coils design is that the two shorter sides, which are not effective for force generation, may be shortened.

According to a further preferred embodiment, the angle between two sides of each coil is either $(4i+1)\alpha_q$, $(4i+2)\alpha_q$, or $(4i+3)\alpha_q$, where $\alpha_q$ is a quarter of the angular pitch ($\alpha_p$) of the magnet array ($\alpha_q = \alpha_p/4$) and i is an integer (i=0, 1, 2, 3, 4, . . . ). Preferably the angle between two sides of each coil must not be an integer number of a full pitch.

According to a further preferred embodiment the plurality of coils belonging to group A and connected to phase A are arranged around the circumference (C) of the ring-shaped stator base element by placing a first coil 1A. The other coils are arranged around the ring-shaped stator base element circumference by rotating coil 1A by an angle of either $4j\alpha_q$ or $(4j+2)\alpha_q$ (j=0, 1, 2, 3, . . . ). If that angle is $4j\alpha_q$, the new coil has the current flowing in the same direction as with coil 1A, and if that angle is $(4j+2)\alpha_q$, the new coil has the current flowing in the reversed direction compared with coil 1A.

Preferably, after the plurality of coils of belonging to group A and connected to phase A are placed, the entire plurality of coils belonging to group B and connected to phase B is formed by rotating all the coils of phase A by an angle of either $(4k+1)\alpha_q$ or $(4k-1)\alpha_q$ (k=0, 1, 2, 3, . . . ). It is preferred that as long as no part of a coil belonging to group B occupies a position around the ring-shaped stator base element that already belongs to one of the coils belonging to group A, the mechanical fabrication of the motor may be realized, and the motor works.

Assuming the first current $(i_1)$ of phase A is $I_0 \cos(\gamma_1\theta+\varphi_0)$, then, depending on the two ways (4k+1 or 4k−1) to form the locations of the coils belonging to group B from the arrangement of the coils belonging to group A, the second current $(i_2)$ of phase B can be either $I_0 \sin(\gamma_1\theta+\varphi_0)$ or $-I_0 \sin(\gamma_1\theta+\varphi_0)$. Here, $\gamma_1$ is a constant depending on the geometry of the ring-shaped stator base element, $\theta$ is the rotor's angular position, $\varphi_0$ is the initial phase related to the calculation of the Lorentz force, and i, j, k are non-negative integers.

Preferably the angle between two coils in the same phase must be an even-integer number of the quarter pitch.

Preferably the angular difference between two phases must be an odd-integer number of the quarter pitch.

Preferably the number $(N_p)$ of angular pitches $(\alpha_p)$ of the Halbach magnet-ring assembly is an integer multiple of both 4 and a further integer, which describes the number of magnets assigned to a coil pair. This condition is preferably applied if the pattern of the coil arrangement is to be repeated and evenly fill the entire circumference of the ring.

The Halbach ring has a whole number of angular pitches. The above condition (total number of quarter pitches being integer multiple of both 4 and some other number) is required if we want the corresponding pattern to be repeated and evenly fill the entire circumference of the ring-shaped stator base element. However, filling the entire circumference of the ring-shaped stator base element is not required for the function of the electric machine.

The following table describes preferred configurations of the electrical machine according to the preferred embodiments I, II, III, IV and V:

| Embodiment | Angle between two sides of each coil | Angle between two coils in the same phase | Angular difference between two phases | Typical case | Number angular pitches around the ring |
|---|---|---|---|---|---|
| I | $\alpha_q$ | $2\alpha_q$ | $(4k + 1)\alpha_q$ | k = 1 | An integer multiple of both 4 and 5 |
| II | $3\alpha_q$ | $4\alpha_q$ | $(4k + 1)\alpha_q$ | k = 2 | An integer multiple of both 4 and 9 |
| III | $3\alpha_q$ | $2\alpha_q$ | $(4k - 1)\alpha_q$ | k = 2 | An integer multiple of both 4 and 7 |
| IV | $2\alpha_q$ | $4\alpha_q$ | $(4k + 1)\alpha_q$ | k = 0 | An integer multiple of 4 |
| V | $2\alpha_q$ | $6\alpha_q$ | $(4k - 1)\alpha_q$ | k = 1 | An integer multiple of both 4 and 3 |

The objective is also addressed by a force-feedback device comprising one or more electrical machines or motors according to one of the previous embodiments. The force-feedback device may comprise the features or combinations of the features described above for the electrical machine or motor. Further, the same advantages may apply for the force-feedback device as described above for the electrical machine or motor.

Such a force-feedback device may preferably be a haptic paddle, another kinesthetic haptic interface, a robot leg, or an end-effector of a robotic wrist. The electric machine or motor may further be implemented in reaction wheels to control a satellite's or a small spacecraft's orientation and in force-feedback steering wheels.

BRIEF DESCRIPTION OF THE DRAWINGS

Further advantages, aims and properties of the present invention will be described by way of the appended drawings and the following description.

In the Drawings:

FIG. 2 shows a rotor according to one embodiment;

FIG. 3a shows a sectional view of a rotor according to one embodiment;

FIG. 3b shows a detail E of FIG. 3a

FIG. 3c shows detail D of FIG. 3a

DETAILED DESCRIPTION OF THE INVENTION

Figure 1:
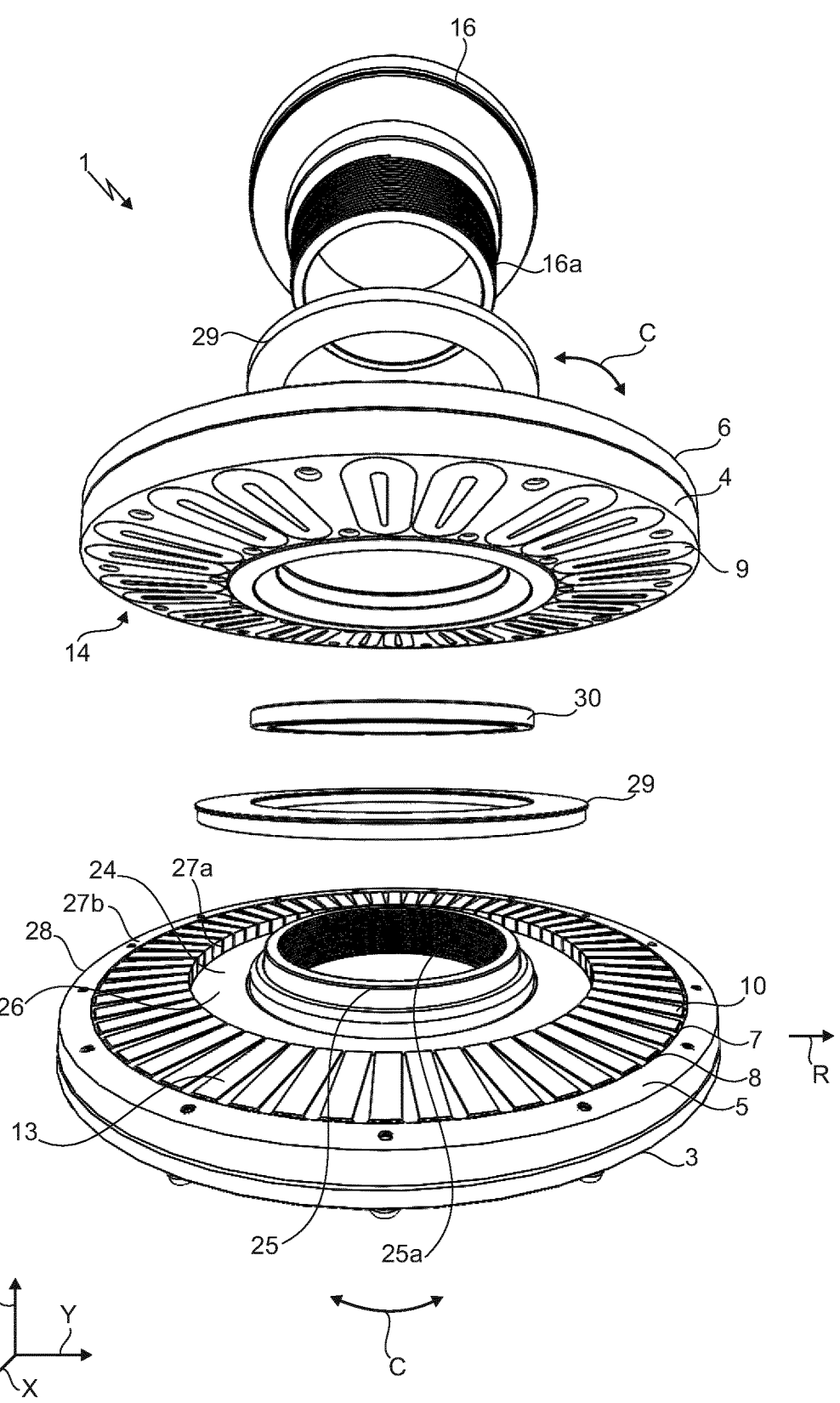
FIG. 1 is an exploded view of an electric machine according to one embodiment.

FIGS. 1 to 7 and 15 to 17 show an electric machine 1, in particular a motor or a generator, comprising a rotor 3 and a stator 4, wherein the rotor 3 comprises a planar, ring-shaped rotor base element 5 and the stator 4 comprises a planar ring-shaped stator base element 6, wherein the rotor base element 5 and the stator base element 6 are aligned along an axial axis Z of the electric machine 1, wherein a plurality of magnet elements 10 are arranged around the circumference C of the ring-shaped rotor base element 5 forming a Halbach magnet-ring assembly 8, wherein the planar Halbach magnet-ring assembly 8 generates a magnetic field $B_R$ with axial and azimuthal components, wherein a plurality coils 9 are arranged around the circumference C of the ring-shaped stator base element 6.

The electric machine 1 is preferably essentially formed as a cylinder with circular base area as can be seen in FIG. 1.

The electric machine 1 extends an axial axis Z and in the radial direction on an XY plane perpendicular to the Z-axis. Further, a circumferential axis C and a radial axis R are used to describe the electric machine 1.

The design of the planar Halbach magnet ring assembly that generates an axial magnetic field preferably along the axial axis Z is not inspired from the original radial-field Halbach cylinder but from the linear Halbach array that produces a nearly perfect sinusoidally varying magnetic field. The interaction between this sinusoidally varying magnetic field $B_R$ and the two-phase planar Lorentz coils currents where the two phases are different by an odd-integer (1, 3, 5, . . . ) of 90°, allows for a constant Lorentz force to be maintained at any point in the working space. Such a linear array is bent with a sufficiently large radius to form a planar Halbach-ring design or Halbach magnet-ring assembly 8.

The magnet elements 10 are permanent magnets. The magnet elements 10 are rare-earth magnets. The magnet elements 10 form a planar magnet array 7. The planar magnet array 7 comprises an integer multiple of spatial periods 7a. Each spatial period 7a has a fixed number $n_{mp}$ of magnet elements 10. The magnet elements 10 are bar-shaped magnets and are arranged on the ring-shaped rotor base element 5 such that a longitudinal extension 12 of the magnet elements 10 extends along the radial direction R of the ring-shaped rotor base element 5. Due to this arrangement a wedge-shaped gap 11 extends between two adjacent magnet elements 10. This wedge-shaped gap 11 is filled by the compliant magnet holder part 24. Preferably two adjacent magnet elements 10 enclose an angle $\alpha_m$, wherein the angle $\alpha_m$ is preferably in a range between 3° and 18°.

Figure 16:
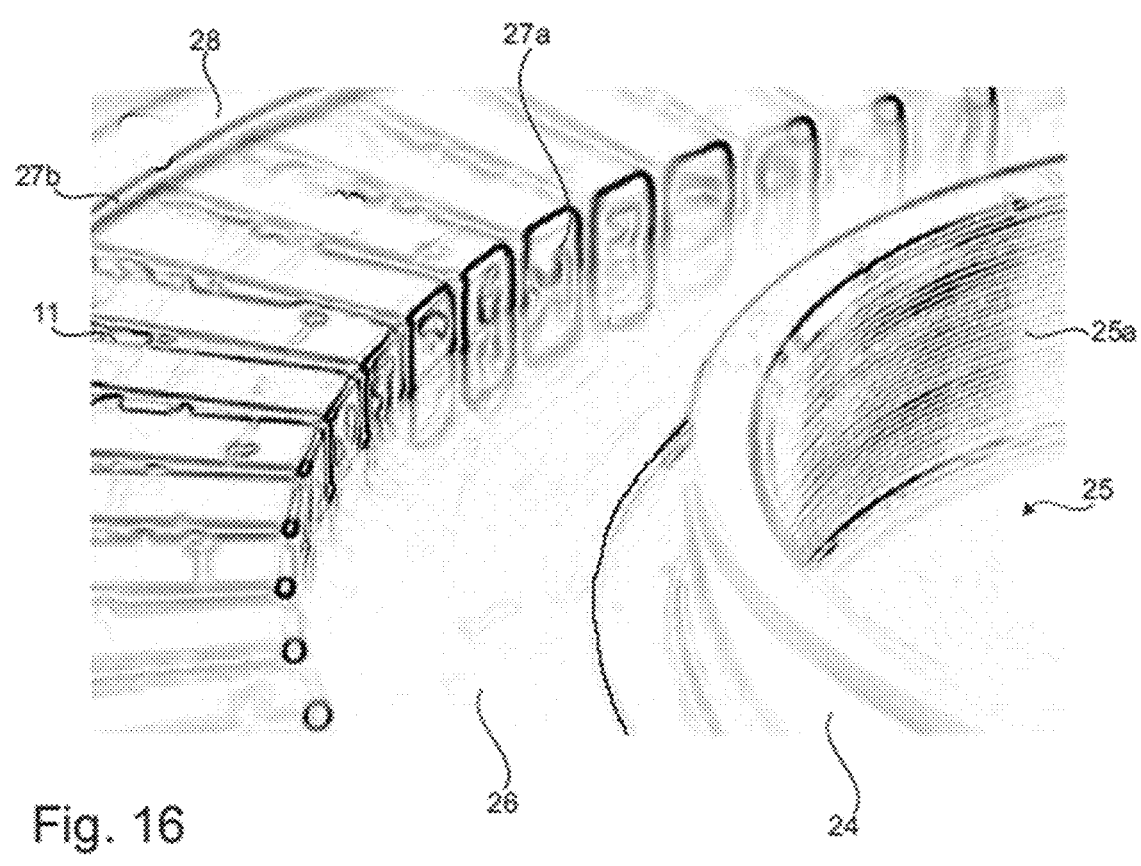
FIG. 16 shows the axial-flux Halbach ring according to one embodiment.

The present design uses only one type of bar magnets 10, which eases the fabrication process and makes the motor 1 scalable due to the availability of rare-earth magnet bars at a variety of sizes. FIG. 16 shows a portion of the Halbach magnet-ring assembly 8. The rotor base element 5 supports the magnetic elements 10. In the center of the rotor base element 5 is a recess 25, having an inner surface 25a with threads. Around the recess 25 a washer 26, preferably made of metal, is arranged and supported by the rotor base element 5. The magnetic elements 10 comprise two end faces 27a, 27b. A first end face 27a abuts the washer 26 and the second end face 27b abuts a compliant holder part 24, preferably made of aluminum. An external conic outer ring 28, preferably made of brass or another material that has low stiction with aluminum, pushes on the compliant holder part 24 and presses the magnetic elements 10 against the washer 26, such that they are fixed in their position. This can be seen in FIGS. 1, 2, and 3a. FIGS. 3b and 3c show the details E and D of FIG. 3a in which the compliant holder part 24, the washer 26 and the outer ring 28 are displayed.

The rotor 2 comprises a number of spatial periods 7a $N_p$ of the planar Halbach ring, where each spatial period 7a contains a number of magnets $n_{mp}$. The angle $\alpha_m$ between two magnet elements 10 can be calculated by $$\alpha_m = \frac{360}{N_p n_{mp}}$$

Figure 8A:
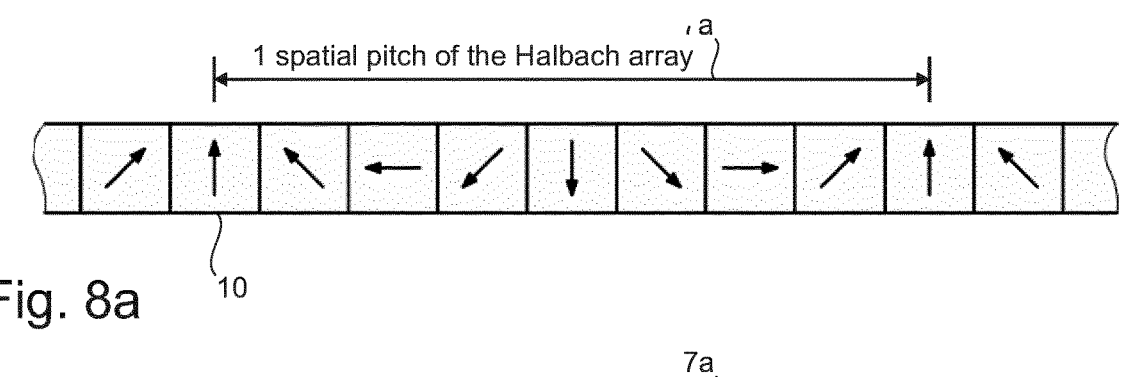
FIG. 8a-8d show sections of different magnet arrays.

The angle $\alpha_m$ is actually enclosed by a center axis of the magnet elements 10, however, for the sake of simplicity in the following it is only referred to an angle between the two magnet elements 10. The spatial period 7a is also called the spatial pitch. For a planar Halbach ring, this pitch is the angular period that the magnets 10 cover the ring's circumference after which the magnetic field variation around the ring's circumference is repeated. Each spatial period 7a of the Halbach magnet array 7 comprises at least four magnet elements 10. In the embodiment according to FIGS. 1, 2, 6, 7 the number of magnet bars in each spatial period 7a is four. The individual magnet elements 10 have individually oriented magnetization $M_i$. The individual magnet elements 10 in the magnet array 7 are arranged according to a magnetization orientation pattern which is a Halbach pattern. In the embodiment according to FIG. 6 the magnetization $M_i$ switches by 90° between the two adjacent magnet elements 10. When looking inward from outside at the magnet-array structure 7 in FIG. 6, and when going counter-clockwise along the circumference of the ring magnet-array 7 (from left to right of the spatial period 7a as in FIG. 6), if the magnetization direction $M_i$ is switched counter-clockwise, then the magnetic field $B_R$ is focused on the upper part of the magnet array 7. In FIG. 8a a further embodiment is shown. Here a spatial period 7a comprises 8 magnet elements 10. The magnetization direction $M_i$ switches by 45° between the two adjacent magnet elements 10. The magnet elements 10 have a square cross section.

Figure 8B:
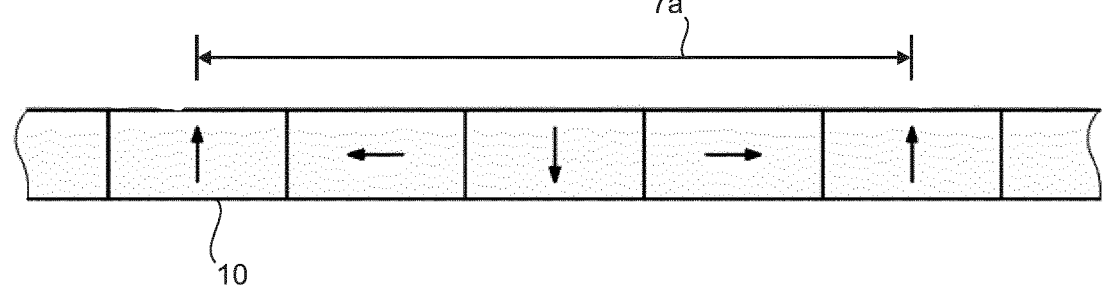
Figure 8C:
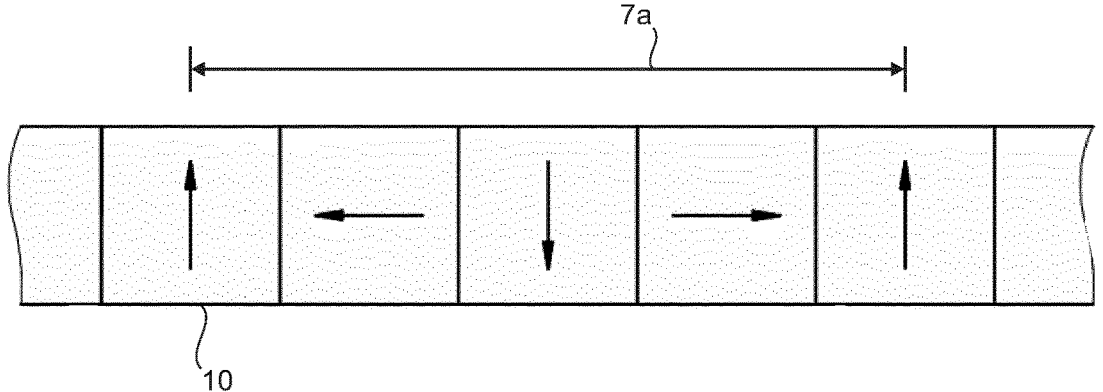
Figure 8D:
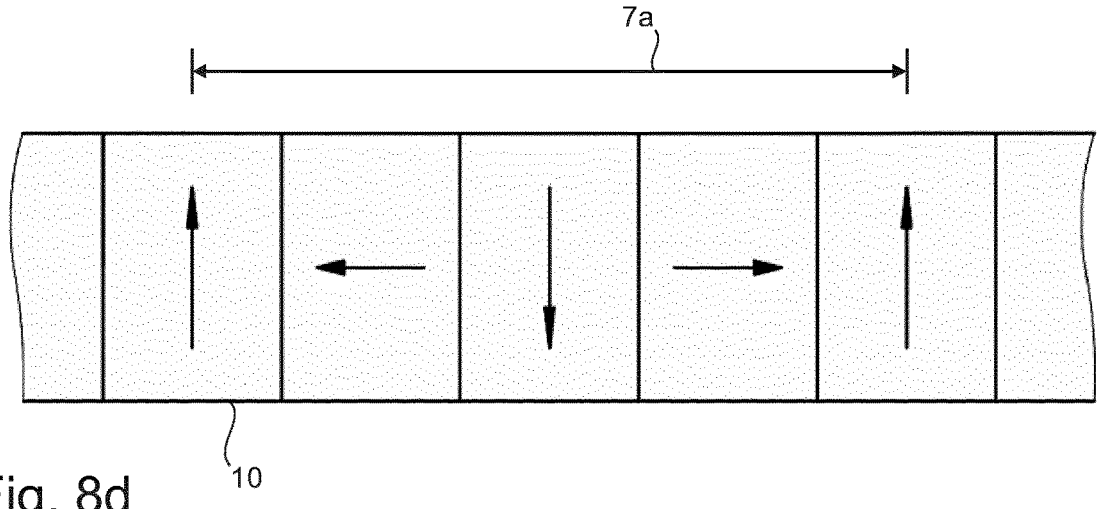

In FIG. 8b, 8c, 8d embodiments are shown with four magnet elements 10 per pitch 7a. The magnetization is switched by 90° between two adjacent magnetic elements 10. In the FIGS. 8a to 8d the horizontal direction of the figure represents the azimuthal direction of the Halbach assembly 8. The normal direction of the figure plane represents the radial direction of the Halbach assembly 8. In the FIGS. 8b, 8c and 8d magnet elements 10 with different cross sections are used. In FIG. 8c the magnet elements 10 have a square cross section. In FIG. 8b the magnet elements 10 have a rectangular cross section, with the longer side of the rectangle extending in the azimuthal direction. In FIG. 8d the magnet elements 10 have a rectangular cross section, with the shorter side of the rectangle extending in the azimuthal direction.

Figures 6, 7:
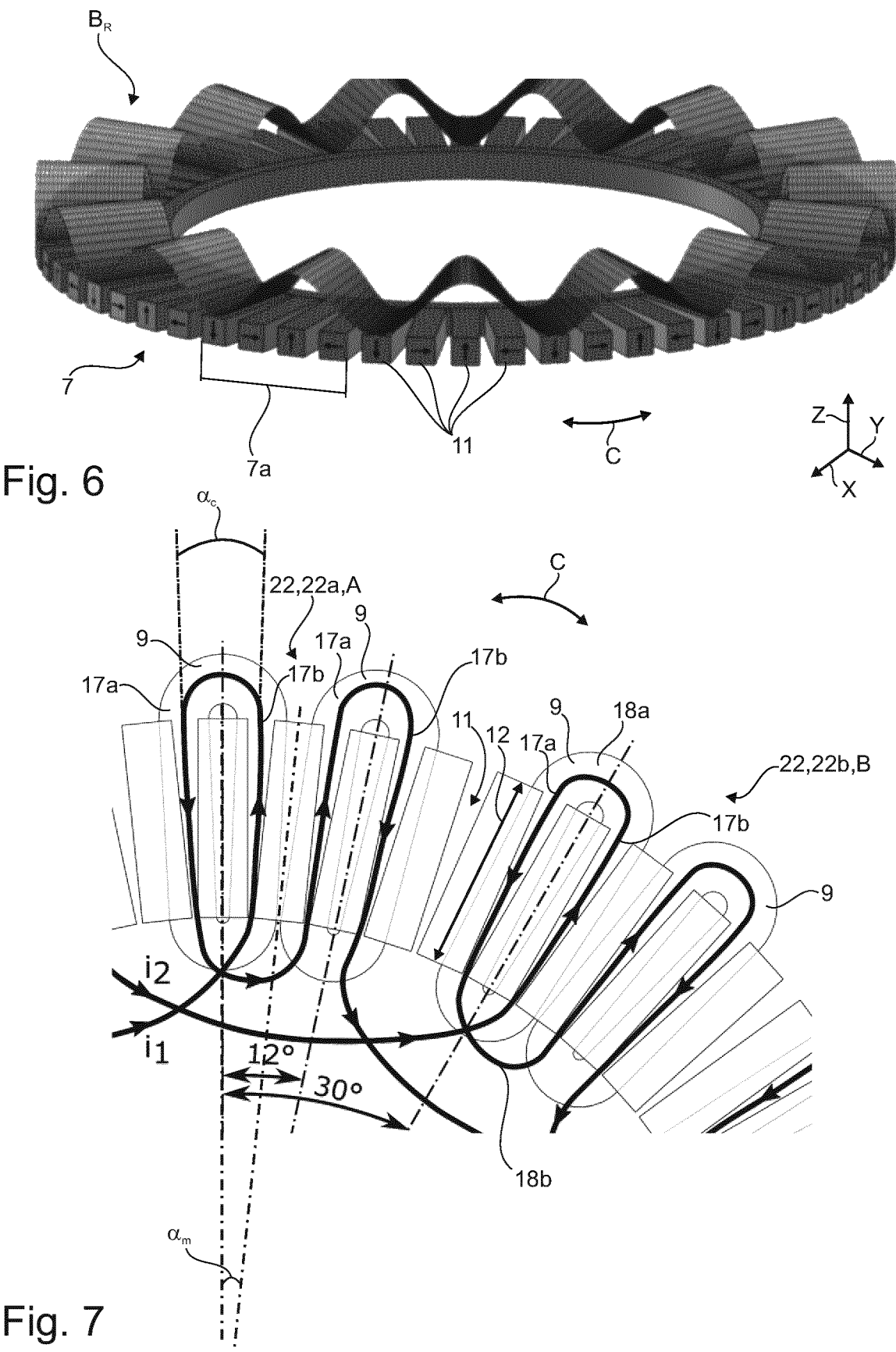
FIG. 6 shows the magnetic field distribution of the Halbach magnet ring assembly according to one embodiment.
FIG. 7 shows a sectional view of an electric machine according to one embodiment, top view of only magnets and coils.

The individually oriented magnetizations $M_i$ of the magnet elements 10 superimpose, resulting in a magnetic field $B_A$. Each spatial period 7a of the magnet array 7 has essentially an identical magnetization orientation pattern. The resulting magnetic field $B_R$ of the Halbach magnet ring assembly 8 is the superposition of the individual magnetic fields $B_A$ of the spatial periods 7a. The magnetic fields $B_A$ of the spatial periods 7a are periodically repeated along a circumferential axis C of the Halbach magnet ring assembly 8. As seen in FIG. 6 the resulting magnetic field $B_R$ of the Halbach magnet ring assembly 8 is approximately a sinusoidally varying magnetic field $B_R$ along a circumferential axis C of the rotor 3.

In the following embodiment according to FIGS. 1 to 7 sixty rectangular magnet elements 10 are used. The angle $\alpha_m$ is here 6°. In FIGS. 10 to 14, the torque-constant measurements and closed-loop control results are displayed using the following embodiment of an electric machine 1 in form of a motor. It is understood that this invention is not limited to this embodiment. In this embodiment sixty rectangular magnet bars (NdFeB N50, 6.35 mm×6.35 mm×25.4 mm) are uniformly arranged on an internal diameter of 136 mm by the metal washer 26. Each set of four adjacent magnets 10 forms a spatial period of the Halbach array 7, which is 24° in this case. FIG. 6 shows an illustration of the variation of the axial component of the magnetic field $B_R$ generated by the Halbach magnet ring assembly 8 on a plane parallel and close to the strong magnet side of the structure (which faces the planar coil array).

Figure 9A:
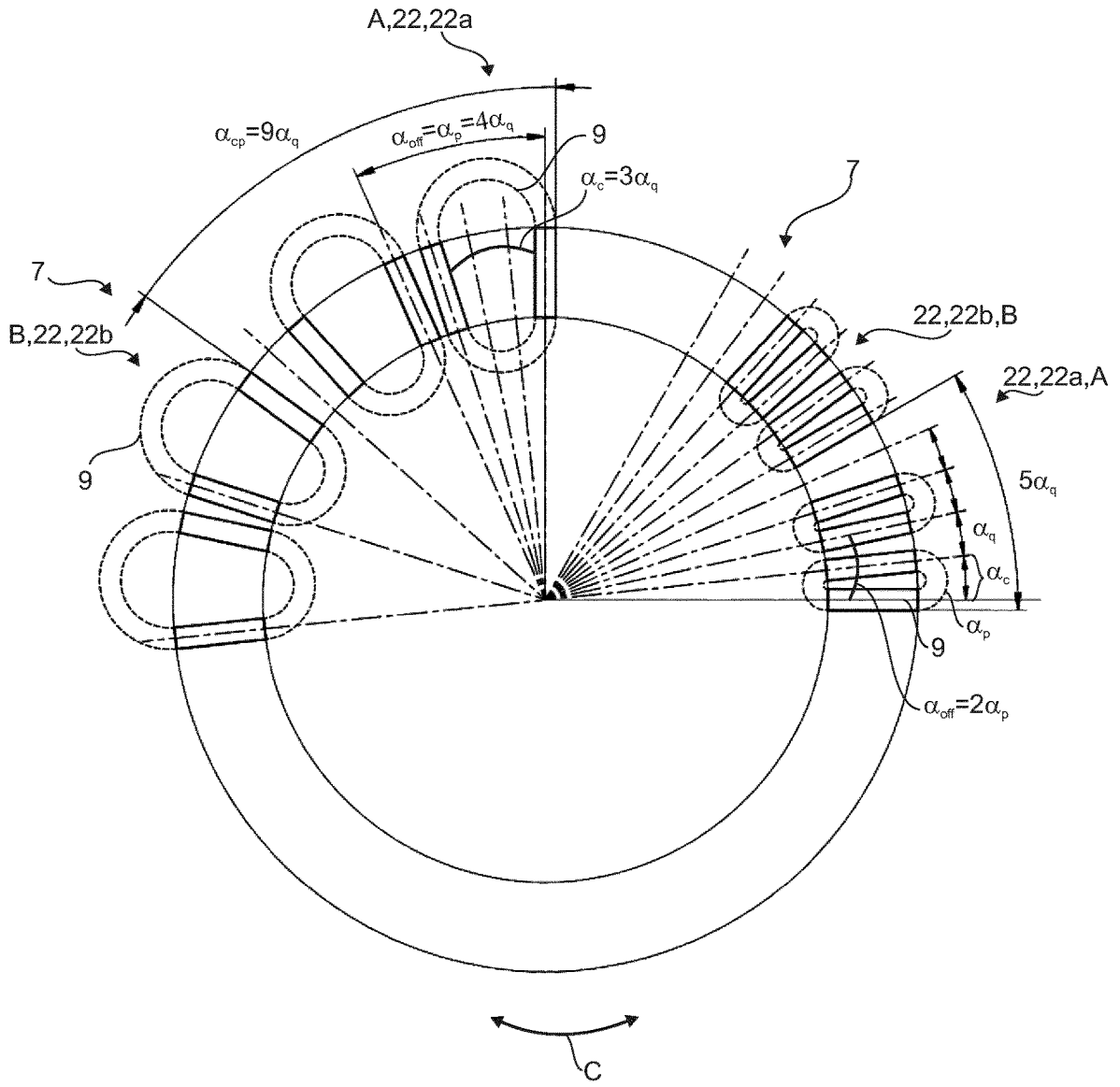
FIG. 9a, 9b show possible coil configurations.
Figure 9B:
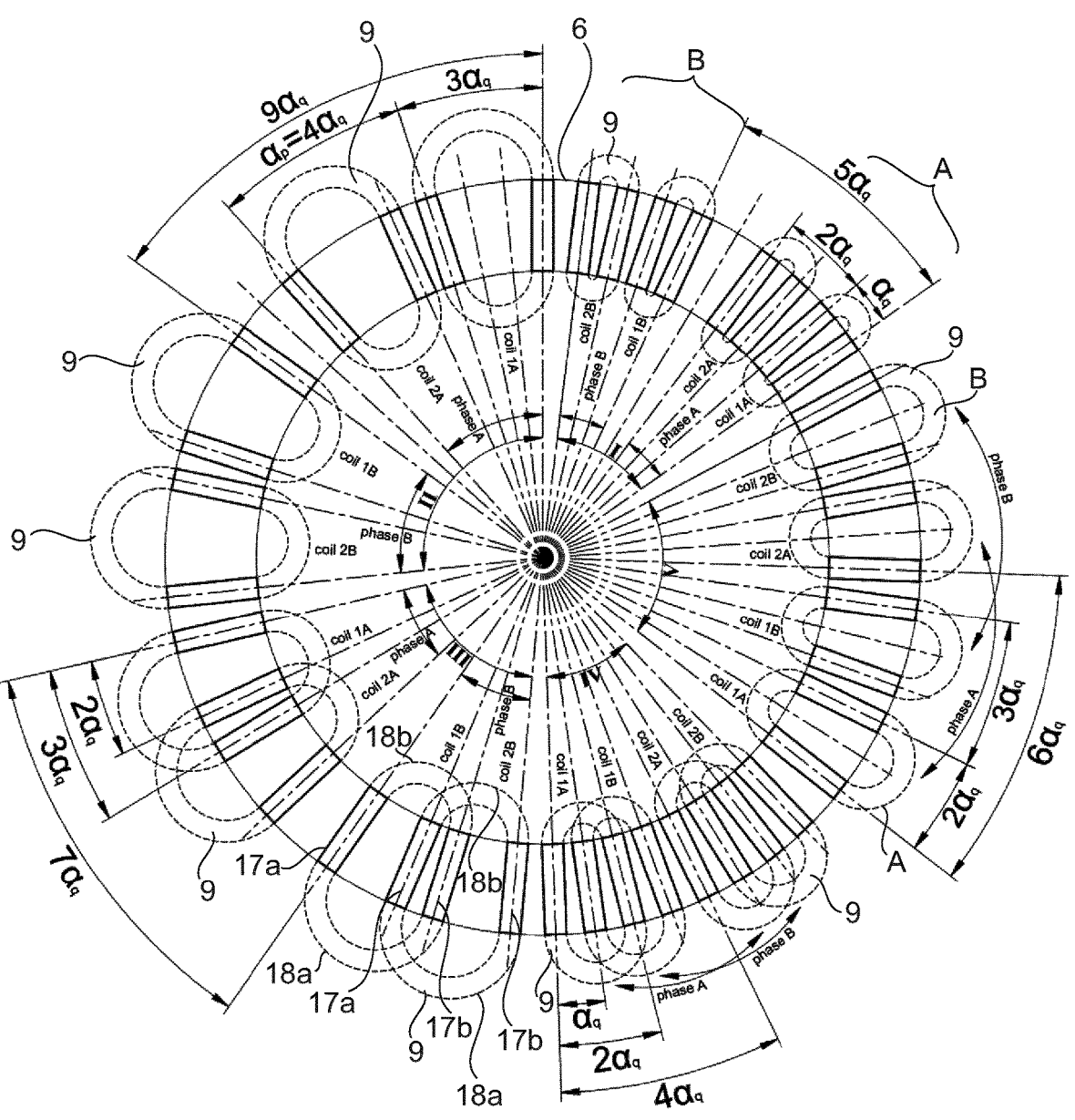

As depicted in the FIGS. 1, 4, 7, 9a and 9b the coils 9 comprise two straight long sides 17a, 17b and two curved short sides 18a, 18b. According to the embodiments shown in FIGS. 1, 4, 7, 9a, 9b the plurality of coils 9 are arranged on the arranged on the stator base element 6 in a non-overlapping manner. In FIG. 9b an overview is given of some preferred embodiments, numbered embodiments I, II, III, IV and V. Embodiments I, II and V show coils 9 arranged in a non-overlapping manner. Here the coils 9 are arranged next to each other such that parts of adjacent coils 9 do not overlap with regard to the circumferential and height direction.

The Embodiments III and IV in FIG. 9b show the plurality of coils 9 arranged on the stator base element 6 in an overlapping manner. In such an overlapping manner only two adjacent coils 9 overlap partially with regard to the circumferential and height direction.

The short sides 18a, 18b of two coils 9 cross each other such that a long side 17a, 17b of a second coil 9 is arranged within the gap between the two long sides 17a, 17b of a first coil 9. This long side 17a, 17b of the second coil 9 may preferably be arranged in the center of the gap formed by the two long sides 17a, 17b of the first coil 9. This is shown in embodiment IV. According to embodiment III the long side 17a, 17b within the gap of the second coil 9 is arranged off center of the gap formed by the two long sides 17a, 17b.

The plurality of coils 9 comprise at least two coils 9 and the plurality of coils 9 are divided into two groups of coils A, B. At least one coil 9 is assigned to each of the two groups of coils A, B. In the first group A of coils 9 runs a first current $i_1$ with a phase A and in the second group B of coils 9 runs a second current $i_2$. The first phase A and the second phase B have a phase difference of an odd-integer multiple of 90°.

The subsets of the two groups A, B of coils 9 are alternatingly arranged around the circumferential axis C, on the stator base element 6. According to one embodiment each subset of the two groups A, B of coils 9 comprises one coil 9. In FIG. 9b the embodiments IV and V show this case. Embodiment V shows the non-overlapping case and embodiment IV shows the overlapping case. A first coil 1A is connected to phase A, and the adjacent coil 1B is connected to phase B. The next adjacent coil 2A is connected to phase A. Coil 2B is connected to phase B, and so on.

According to a further embodiment two adjacent coils 9 form a coil pair 22, 22a, 22b. Each subset of the two groups A, B of coils 9 comprises one coil pair 22, 22a, 22b. This is shown in FIGS. 1, 4, 7, 9a and in the embodiments I, II and III of FIG. 9b.

Preferably the angle between two sides of each coil 9 is either $(4i+1)\alpha_q$, $(4i+2)\alpha_q$, or $(4i+3)\alpha_q$, where $\alpha_q$ is a quarter of the angular pitch 7a ($\alpha_p$) of the magnet array 7 ($\alpha_q = \alpha_p/4$) and i is an integer (i=0, 1, 2, 3, 4, . . . ).

Further the plurality of coils 9 belonging to group A and connected to phase A are arranged around the circumference C of the ring-shaped stator base element 6 by placing a first coil 1A. The other coils 9 (2A, 3A, . . . ) are arranged around the ring-shaped stator base element 7 circumference by rotating coil 1A by an angle of either $4j\alpha_q$ or $(4j+2)\alpha_q$ (j=0, 1, 2, 3, . . . ). If that angle is $4j\alpha_q$, the new coil 9 has the current flowing in the same direction as with coil 1A, and if that angle is $(4j+2)\alpha_q$, the new coil 9 has the current flowing in the reversed direction compared with coil 1A.

Preferably, after the plurality of coils 9 of belonging to group A and connected to phase A are placed, the entire plurality of coils 9 (1B, 2B, 3B, . . . ) belonging to group B and connected to phase B is formed by rotating all the coils 9 of phase A by an angle of either $(4k+1)\alpha_q$ or $(4k-1)\alpha_q$ (k=0, 1, 2, 3, . . . ). As long as no part of a coil belonging to group B occupies a position around the ring-shaped stator base element 7 that already belongs to one of the coils 9 belonging to group A, the mechanical fabrication of the motor 1 may be realized, and the motor 1 works.

Assuming the first current ($i_1$) of phase A of $I_0 \cos(\gamma_1\theta + \varphi_0)$, then, depending on the two ways (4k+1 or 4k−1) to form the locations of the coils 9 belonging to group B from the arrangement of the coils 9 belonging to group A, the second current ($i_2$) of phase B can be either $I_0 \sin(\gamma_1\theta + \varphi_0)$ or $-I_0 \sin(\gamma_1\theta + \varphi_0)$. Here, $\gamma_1$ is a constant depending on the geometry of the ring-shaped stator base element, $\theta$ is the rotor's angular position, $\varphi_0$ is the initial phase related to the calculation of the Lorentz force, and i, j, k are non-negative integers.

Preferably the angle between two sides of each coil must not be an integer number of a full pitch. Preferably the angle between two coils in the same phase must be an even-integer number of the quarter pitch. Preferably the angular difference between two phases must be an odd-integer number of the quarter pitch. Preferably the number ($N_p$) of angular pitches ($\alpha_p$) of the Halbach magnet-ring assembly is an integer multiple of both 4 and a further integer, which describes the number of magnets assigned to one coil. This condition is preferably applied if the pattern of the coil arrangement is to be repeated and evenly fill the entire circumference of the ring.

The Halbach ring has a whole number of angular pitches. However, filling the entire circumference of the ring-shaped stator base element is not required for the function of the electric machine.

The following table describes preferred configurations of the electrical machine according to the preferred embodiments I, II, III, IV and V in FIG. 9b:

| Embodiment in FIG. 9b | Angle between two sides of each coil | Angle between two coils in the same phase among the 4-coil pattern in FIG. 9b | Angular difference between two phases | Typical case | Number angular pitches around the ring |
|---|---|---|---|---|---|
| I | $\alpha_q$ | $2\alpha_q$ | $(4k + 1)\alpha_q$ | k = 1 | An integer multiple of both 4 and 5 |
| II | $3\alpha_q$ | $4\alpha_q$ | $(4k + 1)\alpha_q$ | k = 2 | An integer multiple of both 4 and 9 |
| III | $3\alpha_q$ | $2\alpha_q$ | $(4k - 1)\alpha_q$ | k = 2 | An integer multiple of both 4 and 7 |
| IV | $2\alpha_q$ | $4\alpha_q$ | $(4k + 1)\alpha_q$ | k = 0 | An integer multiple of 4 |

-continued

| Embodiment in FIG. 9b | Angle between two sides of each coil | Angle between two coils in the same phase among the 4-coil pattern in FIG. 9b | Angular difference between two phases | Typical case | Number angular pitches around the ring |
|---|---|---|---|---|---|
| V | $2\alpha_q$ | $6\alpha_q$ | $(4k-1)\alpha_q$ | $k = 1$ | An integer multiple of both 4 and 3 |
| | Must not be an integer number of a full pitch | Must be an even-integer number of the quarter pitch | Must be an odd-integer number of the quarter pitch | | The Halbach ring has a whole number of angular pitches. The above condition (total number of quarter pitches being integer multiple of both 4 and some other number) is required if we want the corresponding pattern in the figure below to be repeated and evenly fill the entire circumference of the ring |

In the following only embodiments are described with non-overlapping coils 9 and coils arranged in pairs 22, 22a, 22b belonging to alternating groups A, B according to FIGS. 1, 4, 7, 9a, 9b, wherein pairs 22a belong to group A and pairs 22b belong to group B.

Two adjacent coils 9 form a coil pair 22, 22a, 22b. The plurality of coils 9 is divided into groups of pairs 22, 22a, 22b, in particular the plurality of coils 9 is divided into two groups of pairs 22, 22a, 22b belonging to groups A and B. Along circumferential axis C the two different groups are alternating. The coil pairs 22 of each group 22a, 22b are electrically connected, such that in the first group 22a of pairs 22 runs a first current $i_1$ with phase A and in the second group 22b of pairs 22 runs a second current $i_2$ with phase B. The first current $i_1$ and the second current $i_2$ have a phase difference of 90°. Every successive coil in a pair 22 is inverted (has an inverted winding). When the current flows clockwise in the first coil, it circulates counterclockwise in the second.

Preferably for the electric machine 1 design it is relevant to define the geometric correlation between the coil sides, coils, and pairs, using the angular pitch of the magnet array. If the Halbach-array ring assembly/magnet array 7 has as $N_p$ spatial periods 7a or pitches, then one spatial period 7a covers an angle of $\alpha_p=360°/N_p$ on the Halbach ring assembly/magnet array 7. A quarter of a spatial period 7a, therefore, covers an angle of $\alpha_q=\alpha_p/4$, as can be seen in FIG. 2.

The design according to FIGS. 1 to 7 is based on the correlation that the two sides 17a, 17b of each coil 9 are separated by an angle $\alpha_c$ of an odd integer multiple $n_0$ ($n_0=1, 3, \ldots$) of the quarter pitch $\alpha_q$.

$$\alpha_c = n_0 \cdot \alpha_q = n_0 \cdot \frac{\alpha_p}{4}$$

Thus, the two effective sides of each planar coil 9 are preferably angled at an integer multiple of a quarter of the angular period of the Halbach-magnet array.

The two coils 9 in the same pair 22 are separated by an offset angle ($\alpha_{off}$):

$$\alpha_{off} = (n_0 + 1)\alpha_q$$

The angle ($\alpha_{cp}$) between the two adjacent coil pairs is given by the relation:

$$\alpha_{cp} = (2(n_0 + 1) + 1)\alpha_q = (2n_0 + 3)\alpha_q$$

The width 19 of the coil sides is not a defining factor. As long as this width allows for the coils to mechanically fit in to satisfy the above angular relations, the motor 1 works. However, the wider the width is, the stronger the torque can be generated.

The angle $\alpha$m is actually enclosed by a center axis of the magnet elements 10, however, for the sake of simplicity in the following it is only referred to an angle between the two magnet elements 10.

A first long side 17a and a second long side 17b of one coil 9 enclose the angle $\alpha_c$. Between said second long side 17b of a first coil 9 and said first long side 17a of a second coil 9 a wedge-like gap exists.

The coils 9 of the stator 4 are essentially planar and are not provided with an iron core. The present motor is therefore a brushless ironless motor. All the coils 9 arranged on the stator base element 6 are essentially identical. The width 19 of the long sides 17a, 17b of the coils 9 does not have to be equal to the width 21 of a magnetic element 10. It is the angle $\alpha_c$ between the two sides 17a, 17b of each coil 9 and the angle $\alpha_{off}$ between the two coils 9 in each pair 22, 22a, 22b, and the angle $\alpha_{cp}$ between the coil pairs 22, 22a, 22b, that matters, as shown in FIG. 9a. The length 20 of the long sides 17a, 17b of the coils 9 is essentially greater than or equal to the length 12 of a magnetic element 10. The two long sides 17a, 17b of one coil 9 enclose an angle $\alpha_c$ of an integer multiple of a quarter of the spatial period 7a of the Halbach ring. Each spatial period 7a comprises an angular pitch $\alpha_p$, which is given by 360° divided by the number $N_p$ of angular pitches or spatial periods 7a. Between the long sides 17a, 17b is a wedge-like gap, such that a distance between the long sides 17a, 17b increases radially outward. Thus, the coils have a shape close to a rectangle or a trapezoid. The short sides 18a, 18b are connecting the two long sides 17a, 17b and have the form of a segment of a circle or an arc. Due to the wedge-like gap between the long sides 17a, 17b, the short side 18b arranged radially inward has a smaller radius than the other short side 18a.

The total number of magnet elements 10 of the Halbach ring 8 or the magnet array 7 is $n_{mt}=N_p \times n_{mp}$. The angle $\alpha_c$ between the two sides 17a, 17b of each planar coil 9 is an odd-integer $n_0$ multiple of $\alpha_q$ which is a quarter of the angular pitch $\alpha_p$ of the Halbach ring 8 and the magnet array 7, as illustrated in FIG. 9a. An offset angle $\alpha_{off}$ between the two coils 9 in one pair 22, 22a, 22b is: $\alpha_{off}=(n_0+1)\alpha_q$, The angle $\alpha_{cp}$ between the two adjacent coil pairs is: $\alpha_{cp}=(2(n_0+1)+1)\alpha_q=(2n_0+3)\alpha_q$. As seen in FIG. 9, the design configuration on the right has $n_0=1$. The two sides 17a, 17b of each coil 9 are separated by an angle of $\alpha_c=\alpha_q$. The two coils 9 in one pair 22, 22a, 22b are separated by $\alpha_{off}=2\alpha_q$, and the two adjacent pairs 22, 22a, 22b are separated by $\alpha_{cp}=5\alpha_q$. The design configuration on the left has $n_0=3$. The two sides 17a, 17b of each coil 9 are separated by an angle $\alpha_{off}=3\alpha_q$, the two coils 9 in one pair 22, 22a, 22b are separated by $\alpha_{off}=4\alpha_q$, and the two adjacent pairs 22, 22a, 22b are separated by $\alpha_{cp}=9\alpha_q$.

A spatial period (7a) of a magnet array 7 comprises four magnets. The rotor 3 comprises a number of magnets ($n_m$), which is a multiple integer of 4 and 5, wherein the number of coils ($c_m$) is the number of magnets ($n_m$), divided by 5 and multiplied by 2.

Due to this design according to FIGS. 1 to 7, a group 22, 22a, 22b of coils 9 spatially covers essentially 4 magnet elements 10. The axial component of the magnetic field $B_R$ (perpendicular to the plane of the planar magnet ring) interacts with the radially oriented long sides 17a 17b of the coils 9 and generates Lorentz forces in tangential directions, which produce a net torque to drive a relative motion of the rotor 3 relative to the stator 4. Since the long sides 17a, 17b of the coils essentially have the same shape and distances to each other as the magnetic elements 10 a coil pair may cover 4 magnetic elements. Due to this design of the coils 9 the two long sides 17a, 17b of one coil 9 experience a magnetic field with a phase difference of 90°. There is a distance around the circumferential axis between the coil pairs 22, 22a, 22b, such that one magnet element 10 is placed between a first group 22a of coil pairs and a second group of coil pairs 22b, in case the coil pairs 22 of the first group 22a and the coil pairs of the second group 22b essentially cover four magnet elements. This is apparent in FIG. 7 which is a top-view rendering of four coils behind the Halbach magnet ring assembly 8. The lines with arrowheads show the paths by which positive current flows through the two sets of coils 9. Thus, to each coil pair five magnet elements are assigned. Due to the phase difference in the two long sides 17a, 17b of one coil 9 and the phase difference in the currents $i_1$ and $i_2$ of the two coil pairs 22, 22a, 22b a continuous Lorentz force acts in the same circumferential direction.

Figure 4:
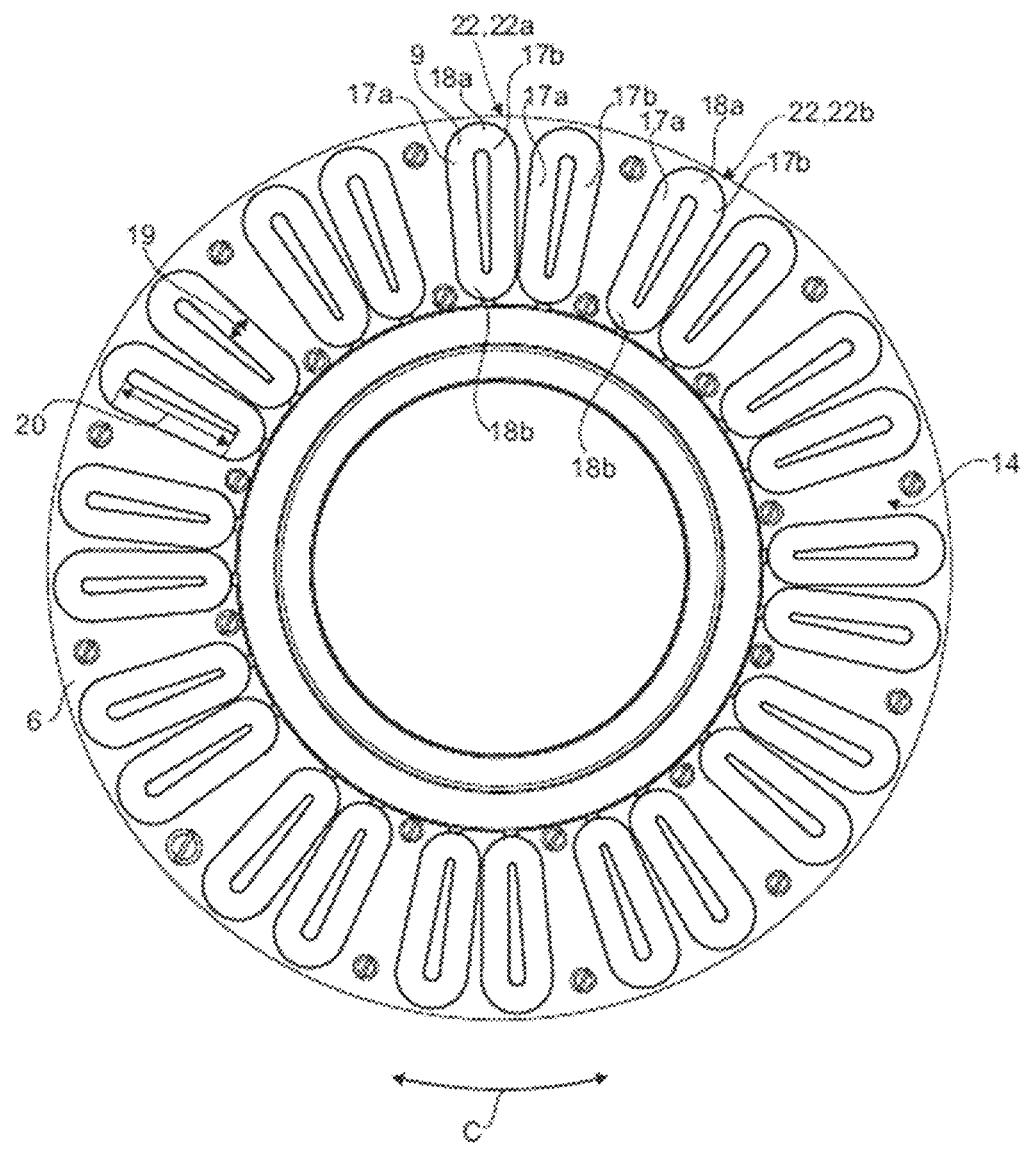
FIG. 4 shows a stator according to one embodiment.
Figure 5:
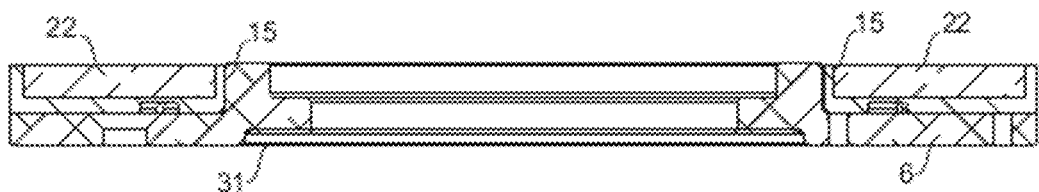
FIG. 5 shows a sectional view of a stator according to one embodiment.

The magnet elements 10 are arranged on the rotor base element 5 such that the rotor base element 5 comprises an essentially level top-surface 13. This is depicted in FIGS. 1, 2, and 3a to 3c. The coils 9 are received in a recess 15 of the stator base element 6, such that the stator base element 6 comprises an essentially level top-surface 14. This is depicted in FIGS. 1, 4, and 5.

The ring-shaped rotor base element 5 and the ring-shaped stator base element 6 are arranged on a holding element 16, such that the top surface 13 of the rotor base element 5 and the top surface 14 of the stator base element 6 are facing each other. Herby an air gap is formed between the top surface 13 of the rotor base element 5 and the top-surface 14 of the stator base element 6. The top surface 13 of the rotor base element 5 and the top surface 14 of the stator base element 6 are essentially parallel to each other.

FIG. 1 shows a three-dimensional rendering of the motor's exploded view. The holding element 16 is formed as a hollow screw, which might preferably be in polymer. The holding element 16 in form of a hollow screw has threads in one of its outer cylindrical surfaces 16a, allows for the adjustment of the gap between the rotor 3 and the stator 4 and helps fix the whole motor assembly. The holding element 16 is in the form of a hollow screw which is placed through a recess 31 of the stator base element 6. The recess 31 is placed at the center of the stator base element 6. The motor 1 further comprises two thrust needle bearings 29. One bearing is on top of the stator base element 6, and the other is between the stator base element 6 and the rotor base element 5. Further a thin section bearing 30 is provided between the stator base element 6 and the rotor base element 5. Thanks to the use of thrust needle bearings, a high axial load can be accommodated while keeping the motor in operation.

Figure 17:
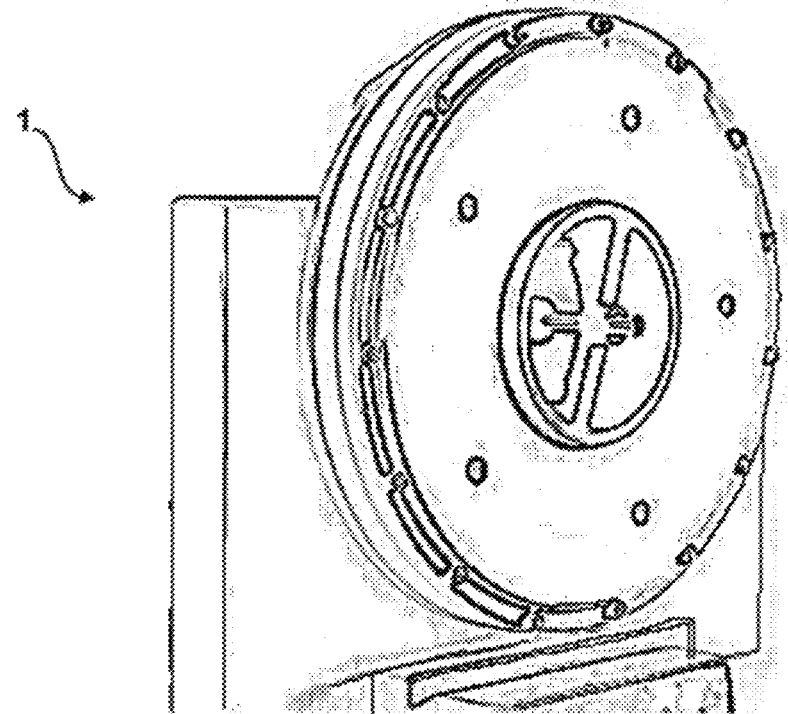
FIG. 17 shows an electric machine according to one embodiment.

FIG. 17 shows an embodiment of a motor 1. The motor has the dimensions of 206 mm outer diameter, 70 mm inner diameter, and 36 mm thickness. The rotor's total mass is 1.56 kg, and the mass moment of inertia of the rotor assembly with respect to the main rotor axis is 0.009 kg-m$^2$.

In the present design according to FIGS. 1 to 7 there are twenty-four coils 9 (divided into two phases with twelve coils 9 per phase) fixed to the stator base element 6. The shape of the planar Lorentz coils 9 is tailored to take advantage of the sinusoidal-varying magnetic flux density $B_R$ around the circumference of the Halbach magnet ring assembly 8. The coils 9 are specifically designed to have the size and shape for which they are optimally arranged on a planar ring structure. The mechanical configuration for the interaction between the coils 9 and magnet elements 10 in this design is different from those known in the art. The present motor 1 is a two-phase design which allows for the Lorentz coils 9 to be non-overlapped and made individually before the stator 4 is assembled. Typically overlapped three-phase coils need to be wound directly into the stator slots where the wire turns in each slot come from two other slots. With this, the coil fill factor is low and the wire turns cannot maintain good straightness, especially when one needs to make thicker coils in the radial direction to produce more force. Therefore, such designs of the prior art could be good for high-speed and low-torque applications where the uniformity of the coils and the precision of the force model are not a concern. In contrast, the present electric machine 1 has two-phase coils 9 with the coils made and assembled separately.

Compared to the two-phase Lorentz-force motor reported in the document V. H. Nguyen et al., (V. H. Nguyen and W. Kim, "Novel Electromagnetic Design for a Precision Planar Positioner Moving Over a Superimposed Concentrated-Field Magnet Matrix," in IEEE Trans. Energy Conversion, vol. 27, no. 1, pp. 52-62, March 2012) with non-overlapped planar coils, the present electric machine 1 differs not only in the bending of a linear array to form a planar ring structure but also in a new coil-magnet interaction configuration. The two long sides of each coil in the mentioned document differed in phase by 180°, while the two sides of each coil in this invention differ in phase by an integer multiple of 90°, which is 90° for case 1, 270° for cases II and III, and 180° in cases IV and V, as shown in FIG. 9b. This change helps shorten the other two sides 18a, 18b of each coil 9, which are not effective for force generation. Besides, in the present case the length and width of each long coil side 17a, 17b (effective for force generation) exactly match those of a magnet element 10. Electrically, each phase of the twelve coils 9 has a total resistance of 1.86Ω and an inductance of 0.6 mH.

Although planning for a different coil shape and designing a different configuration of the coil-magnet arrangement than those of the planar motor in the above-mentioned document V. H. Nguyen et al., the force calculation introduced in this document may be used to estimate the torque of the present electric machine 1. The Halbach magnet ring assembly has a relatively large radius compared to the length of each rectangular magnet (25.4 mm) so that the planar-ring magnet array still behaves like a linear magnet array. For that the angle $\alpha_m$ between the two adjacent magnet elements 10 must be sufficiently small to keep the magnetic field $B_R$ not considerably weakened at the outer edge of the ring. In this case that angle is 6° as already pointed out. The axial component of the magnetic field $B_R$ (perpendicular to the plane of the planar magnet ring) interacts with the radially-oriented long coil sides 17a, 17b and generates Lorentz forces in tangential directions, which produce a net torque to drive the motor 1. In the document V. H. Nguyen et al. the currents in two adjacent coils (in the same pair) had a phase difference of 90°. In the present design of an electric machine 1 two adjacent coils 9 are electrically connected, making one pair 22, 22a, 22b, as depicted in FIG. 7. That pair 22a has a current with a 90° phase difference from the current of the pair 22b next to it. Therefore, in FIG. 7 if the 24 coils are divided into 12 pairs 22, 22a, 22b, and the pairs 22, 22a, 22b are numbered as 1, 2, 3, . . . , 12 clockwise, then the pairs 22 of the first group 22a of 1, 3, 5, 7, 9, 11 are connected to the same phase, and all other pairs belonging to the second group 22b are connected to the other phase.

The key idea of employing a Halbach magnet array in the present design of a motor 1 (with a constant air gap between the magnet elements 10 and the coils 9) is to have the following relation (equation (1)) between the Lorentz force and the two-phase currents:

$$F = b[i_1\cos(\gamma\theta + \phi) - i_2\sin(\gamma\theta + \phi)]$$

Here, F is the total Lorentz force, $i_1$ and $i_2$ are the two phase currents, b is a constant depending on the magnetic characteristics of the design (including the dimensions of the magnet elements, their remanence, the air gap, and the coils' and Halbach magnet-ring assembly geometries), $\gamma$ is the spatial wave number of the fundamental harmonics of the magnetic field's Fourier series representation, $\theta$ is the angular position of the rotor, and $\phi$ is a constant angle representing the initial phase from which the volume integration for the Lorentz force is taken. Here it is referred to the document V. H. Nguyen et al.

Instead of deriving the analytical solution for the magnetic field $B_R$ and the Lorentz force calculation as in the document V. H. Nguyen et al., the method and results of V. H. Nguyen et al. are used to initiate the formulation described by equation (1), and then two experiments are performed as presented in the following to show that this relation is valid for the present design of an electric machine 1. In order to do that, the total motor torque is expressed as (equation (2)):

$$T = k[i_1\cos(\gamma\theta + \phi) - i_2\sin(\gamma\theta + \phi)]$$

where k is a constant depending on the constant b in the previous relation and the radius to calculate the motor torque from the Lorentz forces generated by the coils 9 and the magnet elements 10 at the outer edge of the ring motor. Now it is noticed that for (equation (3) and equation (4)):

$$i_1 = I\sin(\gamma\theta + \phi)$$
$$i_2 = I\cos(\gamma\theta + \phi)$$

where I is the phase-current amplitude, T equals zero. This means that at a relatively low speed (to avoid slippage or lagging due to the rotor's inertia), the motor works as a synchronous motor, for which if $\theta$ is linearly increased in the currents of the two phases following the rules of equations (3) and (4), the rotor 3 rotates with its angular position matching $\theta$ in equations (3) and (4). This experiment, as presented in the following, validates equation (2) for the present electric machine 1.

In another experiment equation (2) is validated, and the motor's torque is measured as constant, k. The motor torques measured based on the following phase currents (equation (5) and equation (6)):

$$i_1 = I\cos(\gamma\theta + \phi)$$
$$i_2 = -I\sin(\gamma\theta + \phi)$$

Figure 10:
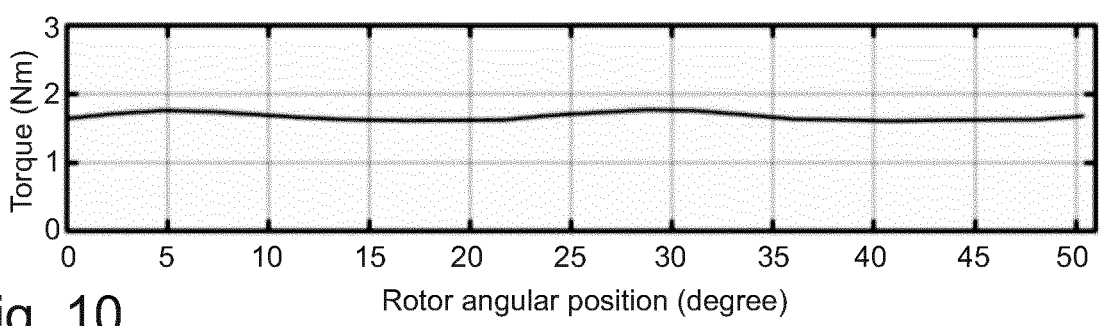
FIG. 10 shows a plot of the measured torque at multiple rotor positions according to one embodiment.

With these currents the torque is constant T=kI. The current amplitude I is fixed, and the rotating motor 1 is stopped at various positions by changing the angular position $\theta$ in the above phase-current waveform. The motor torque is measured at each location to confirm that the measured torque is constant. In this experiment the rotor is stopped at a series of angular positions spaced by an angular step of 2.4°, and the two-phase current amplitude is fixed at 2.14 A. That is, with the phase currents of $i_1=I$ (cos $\gamma\theta+\phi$) and $i_2=-I$ sin($\gamma\theta+\phi$), the amplitude I is fixed at 2.14 A. The motor's 1 torque is measured by using a force meter connected to a point located at 200 mm from the motor's central axis. The plot in FIG. 10 shows the torque versus position. The mean and standard deviation (std) of the measured torque are 1.67 Nm and 0.05 Nm, respectively. The torque constant of the motor is determined to be 0.78 Nm/A. The 0.05-Nm standard deviation of the measured torque, which is 3% of the 1.67 Nm mean value, is due to a variety of reasons including the magnet-to-magnet variation of the magnetic remanence, the errors in the coil fill factor (percentage of copper filled in the total coil volume) of the Lorentz coils, the rotor's and stator's geometric imperfections, and measurement noise. Compared to conventional motors that have maximum torque at the pole locations and no well-controllable torque elsewhere, our 3% torque ripple is negligibly small.

Figure 11:
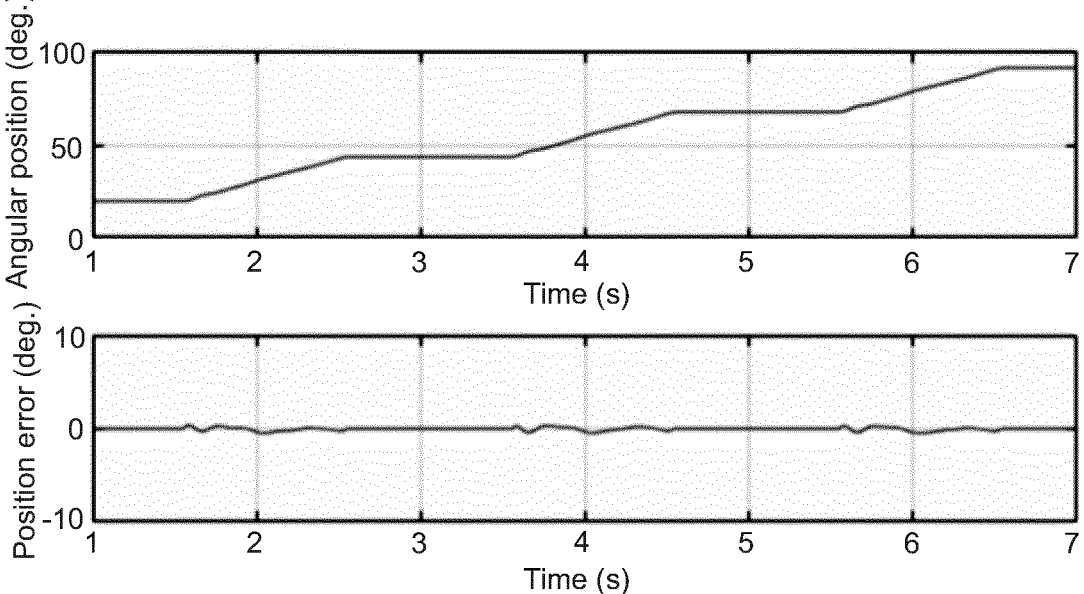
FIG. 11 shows a series of rotor position commanded in open loop according to one embodiment.

In the mode of open-loop operation, the motor works as a synchronous motor, for which the two-phase currents with a 90° phase difference are provided following the waveform described in equations (3) and (4) and the rotor rotates synchronously with these current waveforms. With the e in equations (3) and (4) increased at a constant speed of 24°/s, FIG. 11 shows the corresponding rotor position and the error between the theoretical and measured positions. In all three displacements of 24°, the position errors are within −0.5° and 0.5°, showing a nonlinearity of only 2.1%.

Figure 12:
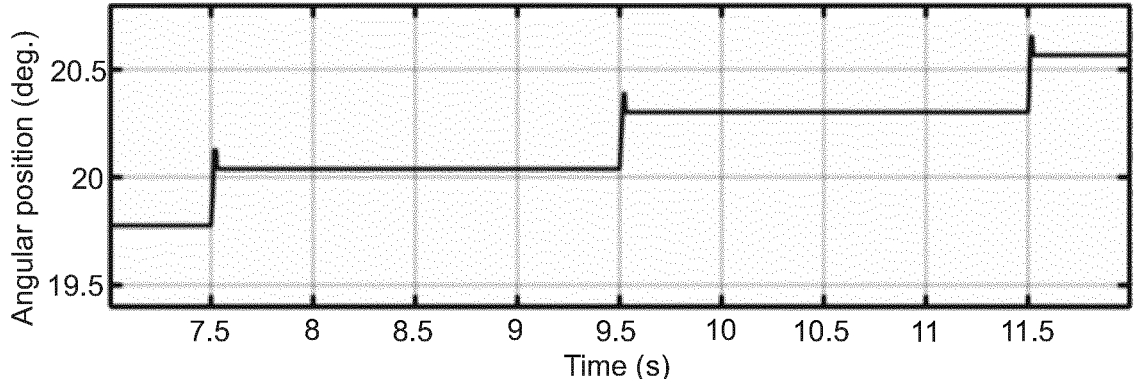
FIG. 12 shows a series of step responses performed in closed-loop position control according to one embodiment.
Figure 13:
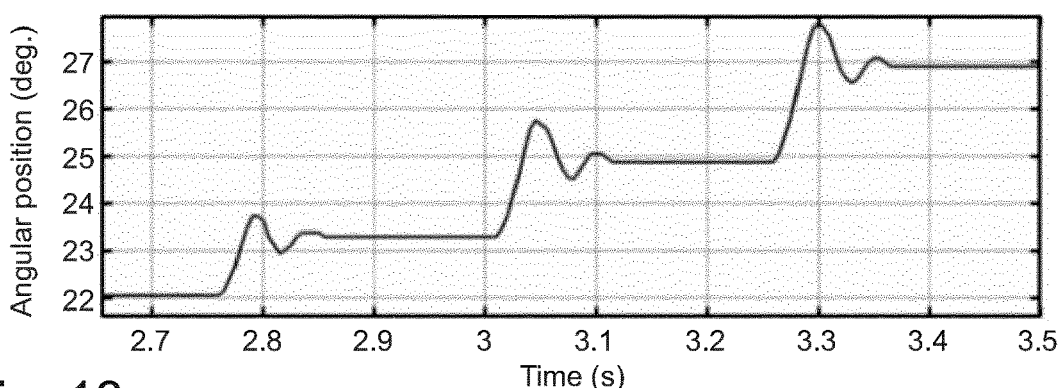
FIG. 13 shows a plot with regard to three steps of 1.2°, 1.6°, and 2° in closed-loop control according to one embodiment.
Figure 14:
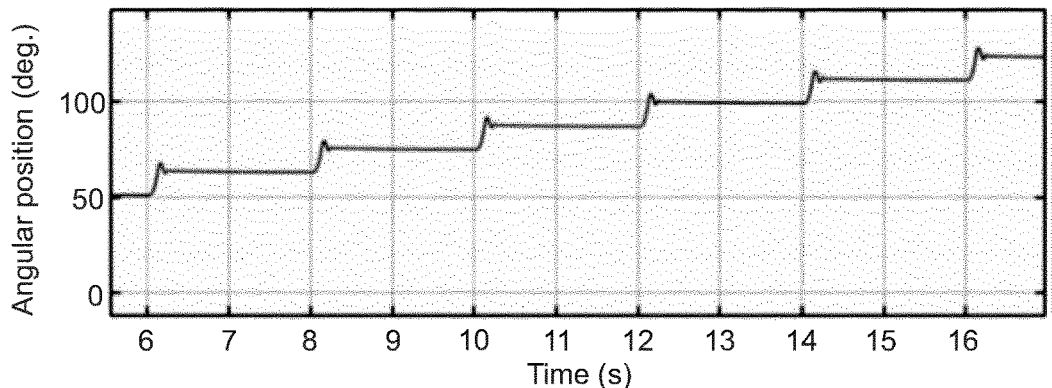
FIG. 14 shows series of 12° steps performed in closed-loop position control according to one embodiment.

For the closed-loop control of the motor, here a simple system model is used based on the rotor's moment of inertia and the measured torque constant but with the friction and damping (from the bearing) ignored. A PID controller is employed on an ARM-Cortex M4 microcontroller running at 240 MHz. For the current generation we design and build two precision current amplifiers, each for a phase of the motor 1, that receive an analog voltage in the range of 0 V to 3.3V and produce a current in the range of −2.8 A to 2.8 A. A rotary encoder with 4096 counts per revolution is used to measure the rotor's angular position. The closed-loop control refreshing rate is fixed at 200 Hz. The results show that closed-loop control stability is achieved with step sizes ranging from 3 encoder counts (0.264°) to a large angle on the order of a full revolution. Any step response with a step size above 2 encoder counts can be performed at any angular position of the rotor. FIGS. 12, 13, and 14 show multiple series of step responses performed at random initial positions. The steps provided here include 1.2°, 1.6°, and 2° in FIG. 13, and 12° in FIG. 14, demonstrating the variety of the step sizes that can be performed by the motor 1. This can only be realized if the motor 1 is capable of generating any desirable amount of torque (within the maximum torque) at any angular position.

The invention presents therefore a brushless ironless motor which generates a constant torque at any angular position. The magnetic field $B_R$ of the rotor 3 is repeated after a certain angular pitch of rotation about the rotor axis. The interaction between the coil currents $i_1$ and $i_2$, which are calculated depending on the rotor 3/stator 4 relative position, and the sinusoidally-varying magnetic field generates a continuous torque at any angular position of the rotor 3.

To target force-feedback applications using a direct-drive electric motor (no transmissions), the torque constant of the motors should be a prioritized factor and be compared between motor designs. The present motor's 1 torque constant is 0.78 $Nm/A_{amp}$ (measured based on the current amplitude), which is 1.10 $N\text{-}m/A_{rms}$ (based on the root-mean square of the current) compared to 0.17 $N\text{-}m/A_{rms}$ to 0.01 $N\text{-}m/A_{rms}$ or even below for commercially available Halbach motors. This emphasizes the fundamental differences between the present two-phase planar-coil design and the existing three-phase motors with overlapped Lorentz coils.

Figure 15:
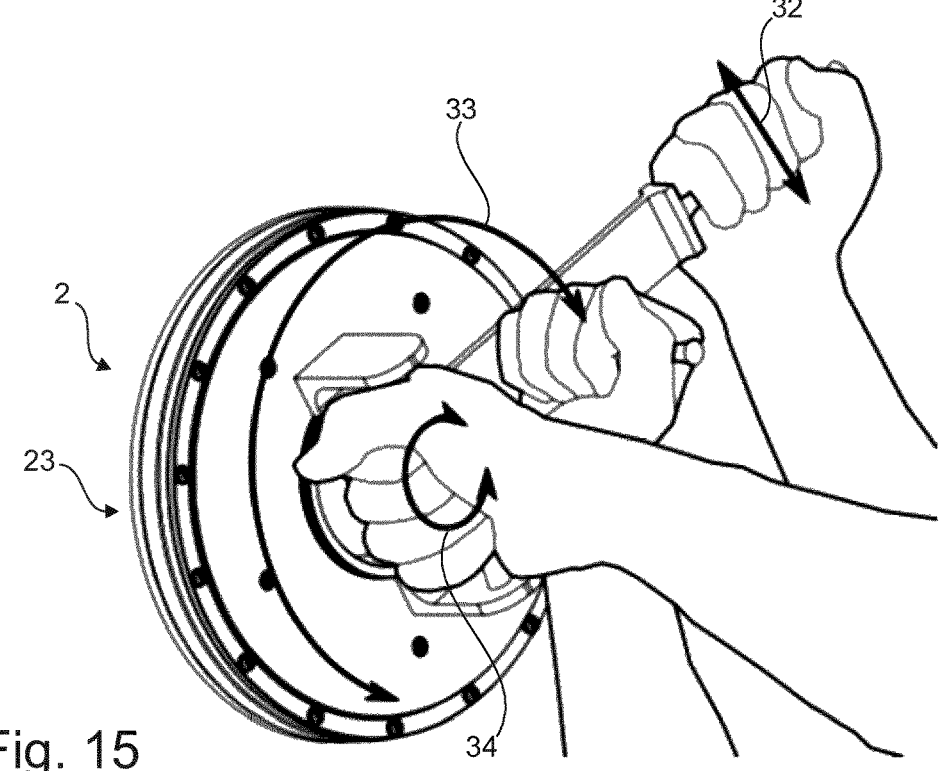
FIG. 15 shows a force-feedback device according to one embodiment.

The motor 1 presented herein can function as a 1-DOF force-feedback device 2 with a single moving part. Such a design is different from other 1-DOF force-feedback devices having multiple parts moving relatively with each other. Due to this, their position errors accumulate, and their motion range is limited because of the constraints created from the transmissions and/or linkages. With an attached handle, the motor can function as a force-feedback device 2 in form of a haptic device 23 with linear force feedback 32 (small range), rotational force feedback 33 (infinite range), and torsional force feedback 34 (infinite range), as depicted in FIG. 15.

Among the reported haptic paddles, the one in document B. Gillespie et al. (B. Gillespie, M. B. Hoffinan and J. Freudenberg, "Haptic Interface for Hands-On Instruction in System Dynamics and Embedded Control," 11th Symposium on Haptic Interfaces for Virtual Environment and Teleoperator Systems, Los Angeles, CA, USA, 2003, pp. 410-415) was a rare one for which a custom motor was constructed. With a work space of only 30°, the maximum torque and torque constant of the iTouch motor in the document B. Gillespie et al. were 0.2 Nm and 0.13 N-m/A compared with 2.2 Nm and 0.78 Nm/A in the present case, respectively. So far, the present motor 1 is the only candidate that can be used for high-torque haptic devices without a transmission unit or linkage mechanism to amplify the torque and enhance the position accuracy.

Thus, a new design for a brushless ironless motor 1 using a Halbach magnet-ring assembly 8 and planar Lorentz coils 9 is presented. This motor design allows for operation at the low-speed high torque regime at any rotational position without the need for a gearbox. Because it outputs a continuous torque with a high torque density, continuous rotation, and no cogging torque, this motor design is suitable for a variety of applications including haptic devices, robotic locomotion, and high-precision alignment and positioning systems with zero backlash and a minimum number of moving parts. The motor's mechanical assembly is discussed and closed-loop control results are provided. The maximum torque that the motor can generate is 2.2 Nm with a phase current amplitude of 2.8 A. With the targeted applications in high-power force-feedback devices, our motor design will help eliminate the concern of compromising between position accuracy and haptic transparency. In addition, with this new motor design, there is no fixed speed-torque curve as with traditional motors, which is a limitation for low speed applications. The speed-torque curve in this case is programmable.

All the features disclosed in the application documents are claimed as being essential to the invention if, individually or in combination, they are novel over the prior art.

LIST OF REFERENCE NUMERALS 1 electric machine, motor
2 force feedback device
3 rotor
4 stator
5 rotor base element
6 stator base element
7 magnet array
7a spatial period of the magnet array
8 Halbach magnet-ring assembly
9 coils
10 magnet element
11 gap
12 longitudinal extension of a magnet element
13 top surface of the rotor base element
14 top surface of the stator base element
15 recess
16 holding element
16a cylindrical surface of the holding element
17a first long side of a coil
17b second long side of a coil
18a first short side of a coil
18b second short side of a coil
19 width of a long sides of a coil
20 length of a long sides of a coil
21 width of a magnetic element
22 coil pair
22a first group of coil pairs
22b second group of coil pairs
23 haptic paddle 24 compliant holder part
25 recess in rotor base element
25a inner surface of recess
26 washer
27a, 27b end faces of magnetic elements
28 outer ring
29 thrust needle bearing
30 thin section bearing
31 recess of the stator base element
32 linear force feedback
33 rotational force feedback
34 torsional force feedback
$\alpha_p$ angular pitch
$\alpha_q$ quarter of angular pitch
$\alpha_m$ angle between two adjacent magnet elements
$\alpha_c$ angle between the two long sides of one coil
$\alpha_{off}$ offset angle between two successive coils
$\alpha_{cp}$ the angle between the two adjacent coil pairs
A Group, Phase
B Group, Phase
$B_R$ resulting magnetic field
$M_i$ magnetization individual magnet element
$B_A$ magnetic array field
$n_{mt}$ total number of magnets
$n_{mp}$ number of magnet elements in a spatial period
$n_c$ number of coils
$N_p$ Number of angular pitches
Z axial axis of the electric machine
X, Y axes
C circumferential axis
R Radial axis
$\alpha_m$ angle
The invention claimed is:

1. An electric machine comprising a rotor and a stator, wherein the rotor comprises a planar, ring-shaped rotor base element and the stator comprises a planar ring-shaped stator base element, wherein the rotor base element and the stator base element are aligned along an axial axis (Z) of the electric machine, wherein a plurality of magnet elements are arranged around the circumference (C) of the ring-shaped rotor base element forming a Halbach magnet ring assembly, wherein the Halbach magnet ring assembly generates a magnetic field ($B_R$) with axial and azimuthal components, wherein a plurality of coils are arranged around the circumference (C) of the ring-shaped stator base element, wherein the plurality of coils comprise at least two coils, wherein the plurality of coils are divided into two groups of coils, wherein at least one coil is assigned to each of the two groups of coils, wherein in the first group of coils runs a first current ($i_1$) and in the second group of coils runs a second current ($i_2$), wherein the first current ($i_1$) and the second current ($i_2$) have a phase difference of an odd-integer multiple of 90°.

2. The electric machine according to claim 1, wherein the magnet elements are permanent magnets and/or rare-earth magnets.

3. The electric machine according to claim 2, wherein the magnet elements are bar-shaped magnets, wherein the magnet elements are arranged on the ring-shaped rotor base element such that a longitudinal extension of the magnet elements extends along a radial direction (R) of the ring-shaped rotor base element, wherein a wedge-shaped gap extends between two adjacent magnet elements, wherein two adjacent magnet elements enclose an angle ($\alpha$), wherein the angle ($\alpha$) is in a range between 3° and 18°.

4. The electric machine according to claim 2, wherein the magnet elements are arranged on the rotor base element such that the rotor base element comprises an essentially level top-surface, wherein the coils are received in a recess of the stator base element, such that the stator base element comprises an essentially level top surface.

5. The electric machine according to claim 4, wherein the ring-shaped rotor base element and the ring-shaped stator base element are arranged on a holding element, such that the top surface of the rotor base element and the top surface of the stator base element are facing each other, wherein an air gap is formed between the top surface of the rotor base element and the top surface of the stator base element, wherein the top surface of the rotor base element and the top surface of the stator base element are essentially parallel to each other.

6. The electric machine according to claim 1, wherein the magnet elements forming a planar magnet array, wherein the planar magnet array comprises an integer multiple of spatial periods, wherein each spatial period has a fixed number ($n_{mp}$) of magnet elements, wherein the individual magnet elements have individually oriented magnetization directions ($M_i$), wherein the individual magnet elements in a spatial period of the planar magnetic array are arranged according to a magnetization-orientation pattern, wherein the magnetization-orientation pattern is a Halbach pattern, and wherein the individually oriented magnetizations ($M_i$) of the magnet elements superimpose, resulting in a strengthened magnetic field ($B_A$).

7. The electric machine according to claim 6, wherein the spatial periods of the planar magnet array have essentially the same magnetization-orientation pattern, wherein the resulting magnetic field ($B_R$) of the Halbach magnet ring assembly is the superposition of the individual magnetic fields ($B_A$) of the spatial periods, wherein the magnetic fields ($B_A$) are periodically repeated along a circumferential axis (C) of the Halbach magnet ring assembly, wherein the resulting magnetic field ($B_R$) of the Halbach magnet ring assembly is approximately a sinusoidally varying magnetic field ($B_R$) along a circumferential axis (C) of the rotor.

8. The electric machine according to claim 1, wherein the coils of the plurality of coils are essentially planar, wherein the coils are not provided with an iron core, wherein all the coils arranged on the stator base element are essentially identical wherein the coils comprise two long sides and two short sides, wherein the length of the long sides of the coils is essentially greater than or equal to the length of a magnetic element.

9. The electric machine according to claim 1, wherein the plurality of coils are arranged on the stator base element in a non-overlapping manner or in an overlapping manner.

10. The electric machine according to claim 1, wherein subsets of the two groups of coils are alternatingly arranged around the circumferential axis (C), on the stator base element.

11. The electric machine according to claim 10, wherein each subset of the two groups of coils comprises one coil.

12. The electric machine according to claim 10, wherein two adjacent coils form a coil pair, wherein each subset of the two groups of coils comprises one coil pair, wherein, the two coils in each pair are electrically connected in opposite winding directions.

13. A force-feedback device comprising one or more electric machines wherein each electric machine of the one or more electric machines comprises a rotor and a stator, wherein the rotor comprises a planar, ring-shaped rotor base element and the stator comprises a planar ring-shaped stator base element, wherein the rotor base element and the stator base element are aligned along an axial axis (Z) of the electric machine, wherein a plurality of magnet elements are arranged around the circumference (C) of the ring-shaped rotor base element forming a Halbach magnet ring assembly, wherein the Halbach magnet ring assembly generates a magnetic field (BR) with axial and azimuthal components, wherein a plurality of coils are arranged around the circumference (C) of the ring-shaped stator base element.

14. A force-feedback device according to claim 13, wherein the force feedback device is a haptic paddle.

* * * * *